United States Patent
Ohta et al.

(10) Patent No.: US 12,051,003 B2
(45) Date of Patent: Jul. 30, 2024

(54) STORAGE MEDIUM, OPTIMUM SOLUTION ACQUISITION METHOD AND INFORMATION PROCESSING APPARATUS

(71) Applicant: FUJITSU LIMITED, Kawasaki (JP)

(72) Inventors: Eiji Ohta, Yokohama (JP); Hisanao Akima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 566 days.

(21) Appl. No.: 17/027,757

(22) Filed: Sep. 22, 2020

(65) Prior Publication Data

US 2021/0097402 A1  Apr. 1, 2021

(30) Foreign Application Priority Data

Oct. 1, 2019 (JP) .................. 2019-181396

(51) Int. Cl.
*G06N 3/088* (2023.01)
*G06N 3/045* (2023.01)

(52) U.S. Cl.
CPC ............ *G06N 3/088* (2013.01); *G06N 3/045* (2023.01)

(58) Field of Classification Search
CPC ............................. G06N 3/088; G06N 3/045
USPC ........................................................ 706/25
See application file for complete search history.

(56) References Cited

U.S. PATENT DOCUMENTS 6,411,945 B1 * 6/2002 Nakajima ............. B60C 1/00
706/19
2017/0161635 A1 6/2017 Oono et al.
2018/0268262 A1 * 9/2018 Osada ................ G06F 18/2411
2019/0393903 A1 * 12/2019 Mandt .................... H03M 7/30
2020/0143448 A1 * 5/2020 Steck ................. G06Q 30/0643
2020/0285939 A1 * 9/2020 Baker .................... G06N 7/01

FOREIGN PATENT DOCUMENTS

| JP | 2010-146068 A | 7/2010 |
| JP | 2019-8499 A | 1/2019 |
| JP | 2019-502988 A | 1/2019 |

OTHER PUBLICATIONS

An & Cho, 2015, "Variational Autoencoder based Anomaly Detection using Reconstruction Probability" (Year: 2015).*
Xu & Tan, Jun. 2019, "Semisupervised Text Classification by Variational Autoencoder" (Year: 2019).*

(Continued)

*Primary Examiner* — Marc S Somers
*Assistant Examiner* — Jun Kwon
(74) *Attorney, Agent, or Firm* — Fujitsu Intellectual Property Center

(57) ABSTRACT

A non-transitory computer-readable storage medium storing a program that causes a computer to execute a process, the process includes obtaining a machine learning model having learned characteristic amounts of a plurality of training data including an objective function; calculating similarities between the characteristic amounts of the plurality of training data by inputting the plurality of training data to the obtained machine learning model; specifying a data group having a high similarity with a desired objective function from the characteristic amounts of the plurality of training data based on distances of the calculated similarities; and acquiring an optimum solution for the desired objective function by using the specified data group.

5 Claims, 29 Drawing Sheets

(56) References Cited

OTHER PUBLICATIONS

Xu & Durrett, 2018, "Spherical Latent Spaces for Stable Variational Autoencoders" (Year: 2018).*
Japanese Office Action mailed Jun. 20, 2023 for corresponding Japanese Patent Application No. 2019-181396, with English Translation, 8 pages.

* cited by examiner

STORAGE MEDIUM, OPTIMUM SOLUTION ACQUISITION METHOD AND INFORMATION PROCESSING APPARATUS

CROSS-REFERENCE TO RELATED APPLICATION

This application is based upon and claims the benefit of priority of the prior Japanese Patent Application No. 2019-181396, filed on Oct. 1, 2019, the entire contents of which are incorporated herein by reference.

FIELD

The embodiments discussed herein are related to a storage medium, an optimum solution acquisition method and an information processing apparatus.

BACKGROUND

In the past, an optimization problem has been known that acquires a best solution (optimum solution) with respect to a desirability scale (objective function) under a given condition (constraint). Generally, when no interaction exists between variables, an optimum solution with respect to an objective function may be relatively easily acquired even by using any optimization method. However, in many problems, an interaction exists between variables though the interaction is not quantitatively known. Therefore, the solution space that is a surface of an objective function formed by a combination set of variables has a plurality of mountains and valleys and is multimodal. Accordingly, in recent years, the searching method is devised, and technologies such as mathematical programming, metaheuristic such as simulated annealing and genetic algorithm, and response surface methodology have been utilized by which the number of searches is reduced and an optimum solution is rapidly acquired. As related art, for example, Japanese Laid-open Patent Publication Nos. 2019-8499 and 2010-146068 are disclosed.

SUMMARY

According to an aspect of the embodiments, a non-transitory computer-readable storage medium storing a program that causes a computer to execute a process, the process includes obtaining a machine learning model having learned characteristic amounts of a plurality of training data including an objective function; calculating similarities between the characteristic amounts of the plurality of training data by inputting the plurality of training data to the obtained machine learning model; specifying a data group having a high similarity with a desired objective function from the characteristic amounts of the plurality of training data based on distances of the calculated similarities; and acquiring an optimum solution for the desired objective function by using the specified data group.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the effect of the increase in speed provided by the technologies above depends on the complexity of a solution space. Therefore, in a complex solution space, the numbers of captures and searches of local solutions are increased, taking an enormous amount of time for optimization. For example, when the solution space is a space where whether optimization exists or not is not known like a multimodal space, there is a possibility that an optimum solution may not be reached in the first place though an enormous amount of time is taken.

In view of this, it is desirable to provide an optimum solution acquisition program, an optimum solution acquisition method and an information processing apparatus that may reduce the time for acquiring an optimum solution.

Hereinafter, embodiments of an optimum solution acquisition program, an optimum solution acquisition method and an information processing apparatus disclosed herein will be described in detail based on drawings. The embodiments do not limit the present disclosure. The embodiments may be combined with each other as appropriate without contradiction.

Embodiment 1

[Description of Information Processing Apparatus]

Figure 1:
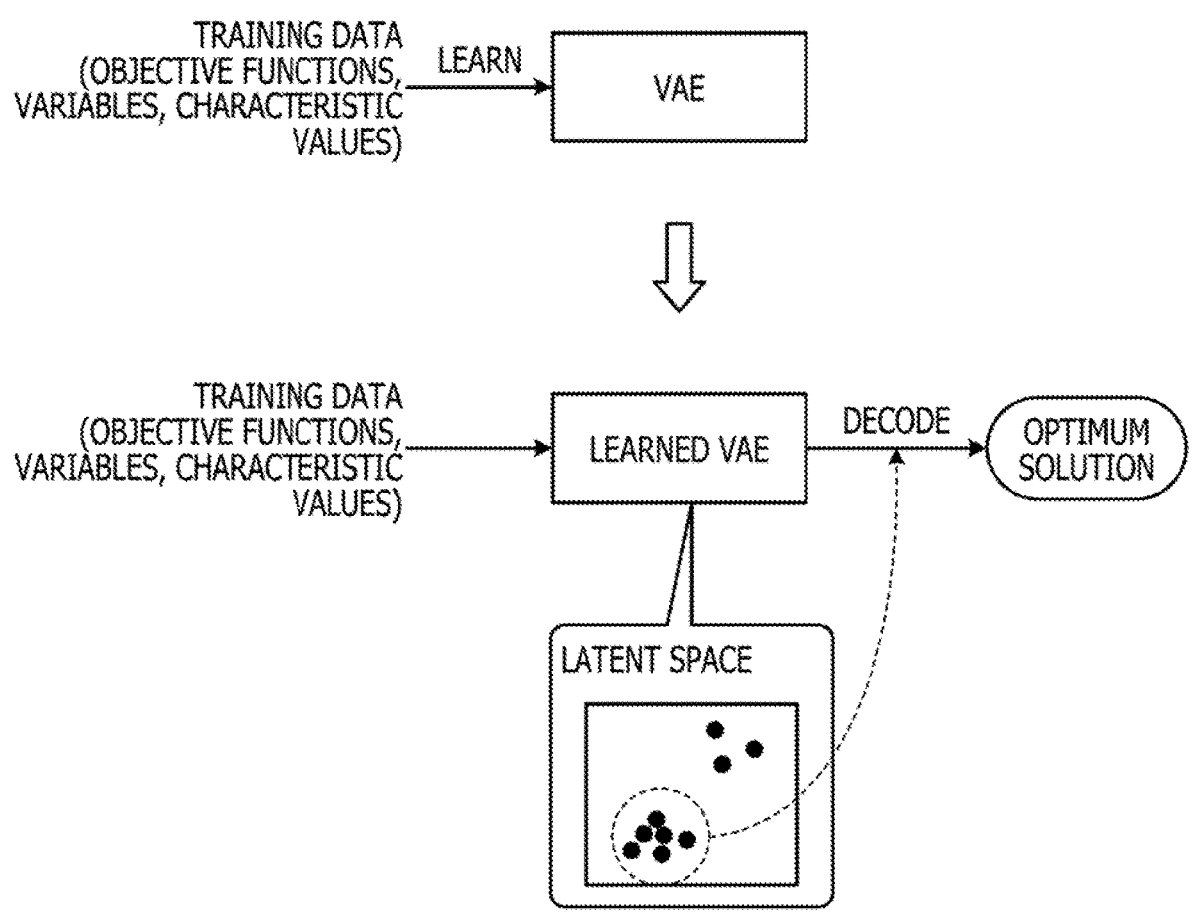
FIG. 1 is a diagram for explaining an information processing apparatus according to Embodiment 1.

FIG. 1 is a diagram for explaining an information processing apparatus 10 according to Embodiment 1. The information processing apparatus 10 illustrated in FIG. 1 is an example of a computer apparatus that acquires an optimum solution with respect to a scale (objective function) desired by a user by learning a machine learning model using a variational autoencoder (VAE).

The VAE learns characteristic amounts of input data by performing dimension compression of the input data to a latent space. This is characterized in that data pieces with higher similarities are placed by concentrating the data pieces into arbitrary points in the latent space. With focus on the characteristic, the VAE is learned by giving objective functions, variables and characteristic values corresponding to correct solution information to training data of the VAE the information processing apparatus 10 according to Embodiment 1, as illustrated in FIG. 1.

After that, when the learning ends, the information processing apparatus 10 constructs a solution space in which objective functions with higher similarities are placed in a concentrated manner by using the latent space of the learned VAE. The information processing apparatus 10 generates a sampling set to which objective functions corresponding to a user's scale in the latent space belong to, as illustrated in FIG. 1.

Subsequently, the information processing apparatus 10 acquires an optimum value for the desired objective function by inference by using a decoder of the learned VAE based on the generated sampling set and acquires variables and characteristic values which give the optimum value for the objective function by inference by using the decoder of the learned VAE. Thus, the information processing apparatus 10 may acquire an optimum solution rapidly even in a complex solution space.

[Functional Configuration]

Figure 2:
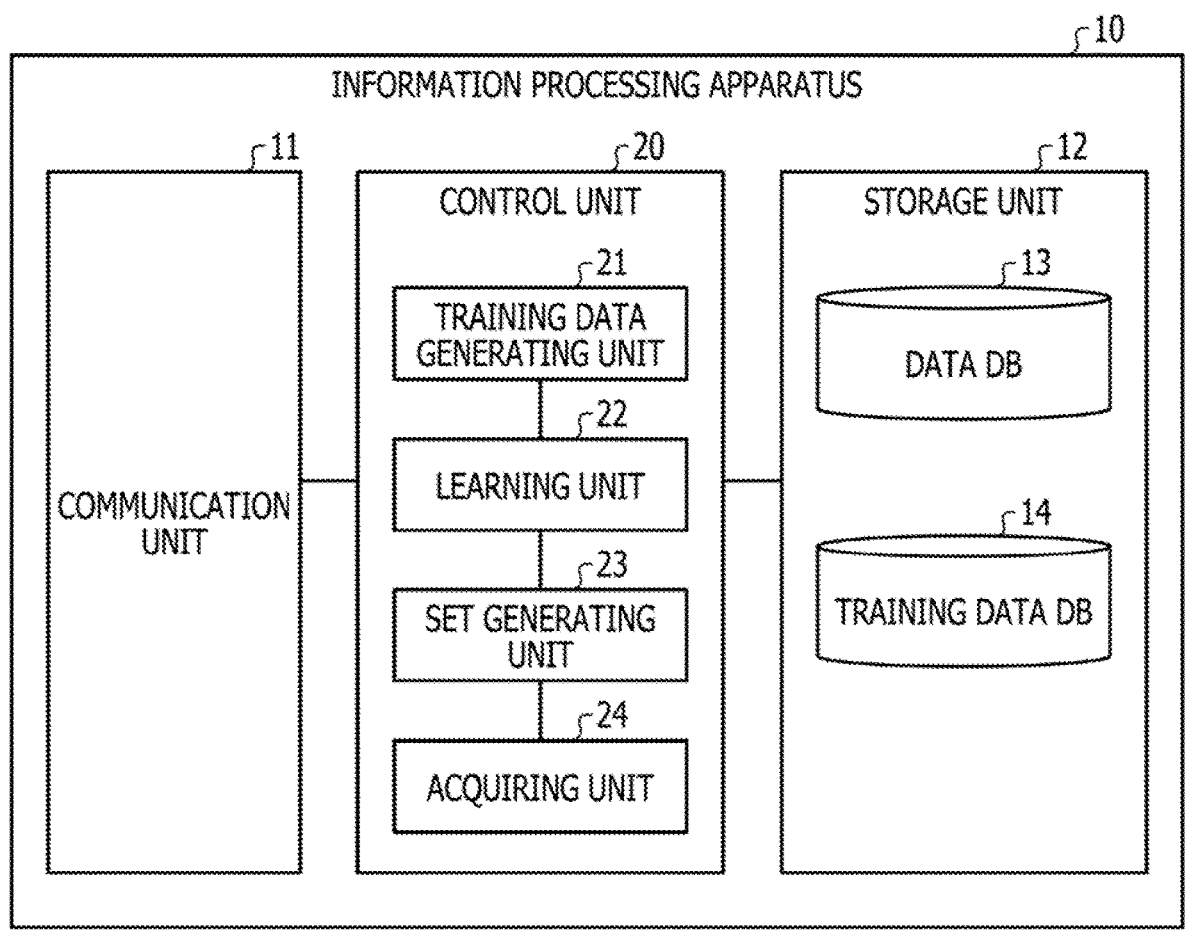
FIG. 2 is a functional block diagram illustrating a functional configuration of the information processing apparatus according to Embodiment 1.

FIG. 2 is a functional block diagram illustrating a functional configuration of the information processing apparatus 10 according to Embodiment 1. As illustrated in FIG. 2, the information processing apparatus 10 includes a communication unit 11, a storage unit 12, and a control unit 20.

The communication unit 11 is a processing unit that controls communication with other devices and is a communication interface or the like, for example. For example, the communication unit 11 receives a processing start instruction from an administrator terminal and transmits a learning result, a result of acquisition of an optimum solution and the like to the administrator terminal.

The storage unit 12 is an example of a storage device that stores, for example, data and a program to be executed by the control unit 20 and is, for example, a memory or a hard disk. For example, the storage unit 12 stores a data DB 13 and a training data DB 14.

The data DB 13 is a database that stores learning data that is a generation source of training data. For example, the data DB 13 stores sensing data sensed by a sensor, data input by an administrator and the like.

The training data DB 14 is a database that stores training data to be used for learning of the VAE. For example, the training data DB 14 stores training data generated from data stored in the data DB 13 by a training data generating unit 21, which will be described below.

The control unit 20 is a processing unit that manages the entire information processing apparatus 10 and is, for example, a processor or the like. The control unit 20 has the training data generating unit 21, a learning unit 22, a set generating unit 23, and an acquiring unit 24. The training data generating unit 21, the learning unit 22, the set generating unit 23 and the acquiring unit 24 are examples of electronic circuits included in the processor or examples of processes executed by the processor.

The training data generating unit 21 is a processing unit that generates training data by using data stored in the data DB 13. More specifically, for example, the training data generating unit 21 specifies objective functions, variables and characteristic values from data stored in the data DB 13, generates Image data corresponding to each of the objective functions, variables and characteristic values for input to the VAE and stores the image data as training data in the training data DB 14.

Figure 3:
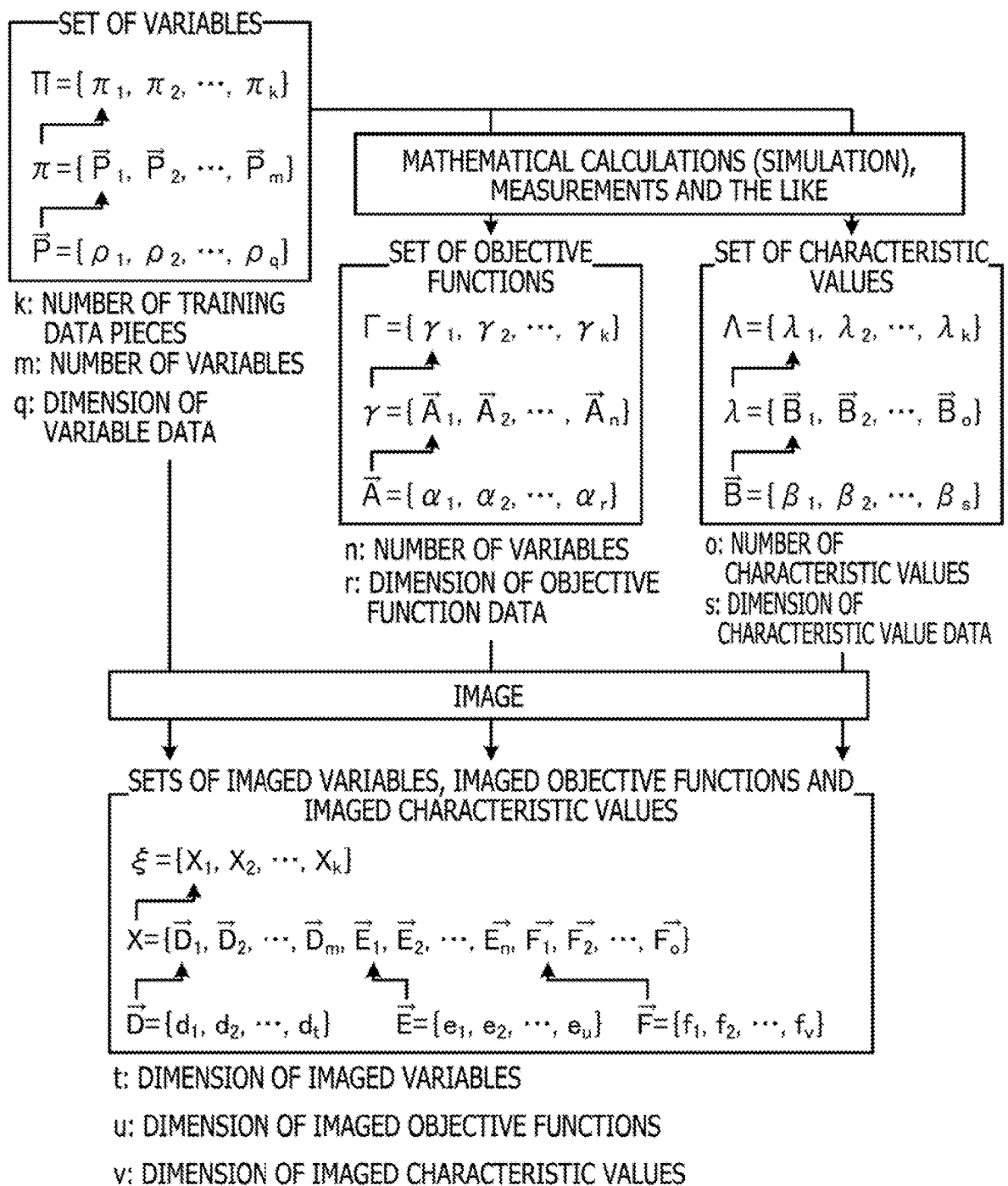
FIG. 3 is a diagram for explaining a generation example of raining data.

FIG. 3 is a diagram for explaining a generation example of training data. As illustrated in FIG. 3, the training data generating unit 21 sets fluctuation ranges of the variables (such as $\Pi$) of the objective functions, variables and characteristic values and generates a set of the variables. The character "k" in the set of variables indicates the number of training data pieces, the character "m" indicates the number of variables, and the character "q" indicates a dimension of the variable data.

Subsequently, the training data generating unit 21 generates a set of objective functions ($\Gamma$) and a set of characteristic values ($\Lambda$) by performing mathematical calculations and measurements on the set of variables. The character "n" in the set of objective functions indicates the number of objective functions, the character "r" indicates a dimension of the objective function data, the character "o" in the set of characteristic values indicates the number of characteristic values, and the character "s" indicates a dimension of the characteristic value data.

After that, the training data generating unit 21 images each of the set of variables, the set of objective functions, and the set of characteristic values, generates a set of imaged variables, imaged objective functions, and imaged characteristic values, and generates the set as training data. The character "t" indicates a dimension of the imaged variables, the character "u" indicates a dimension of the imaged objective functions, and the character "v" indicates a dimension of the imaged characteristic values.

(Specific Example of Training Data Generation)

Figure 4:
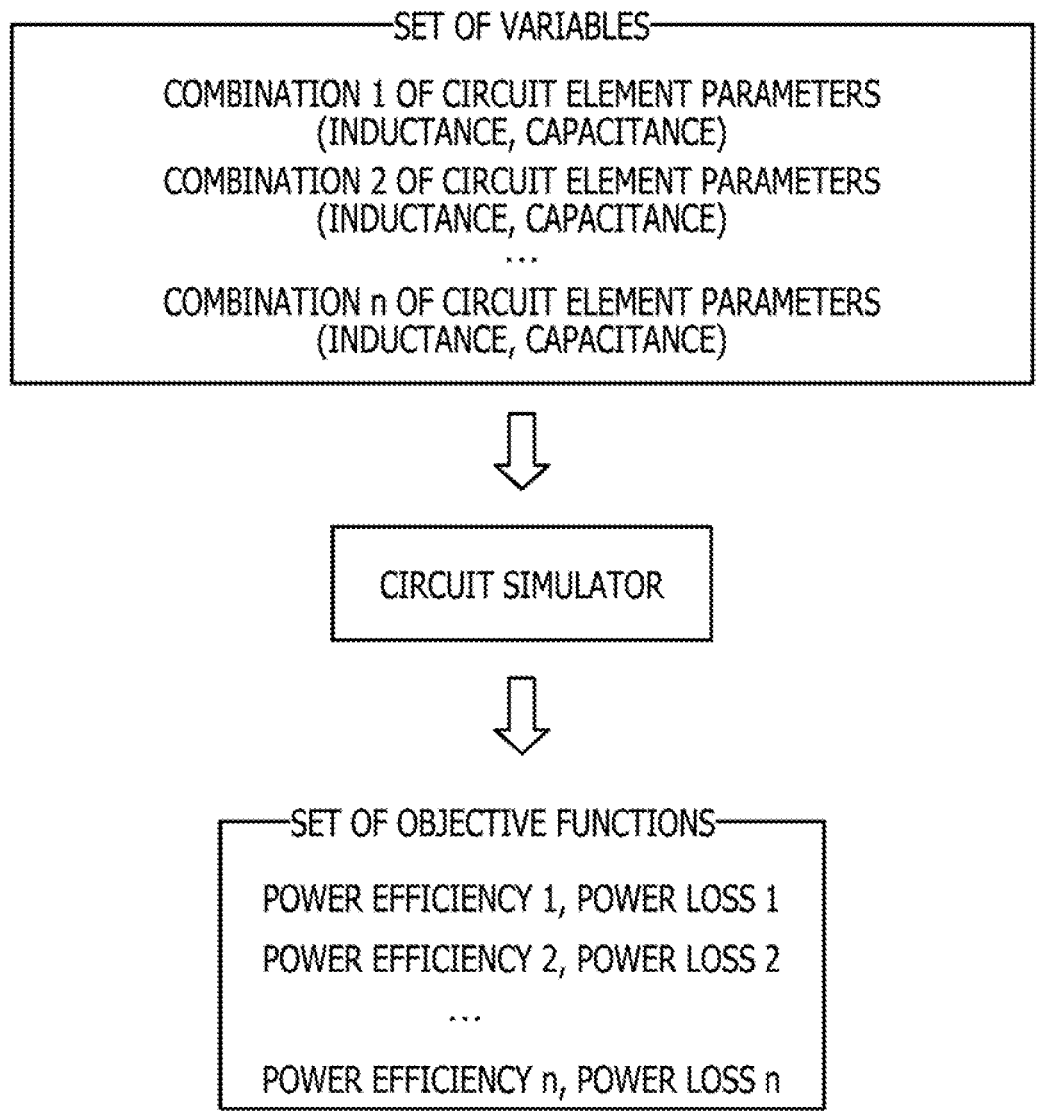
FIG. 4 is a diagram for explaining a generation example of a set of objective functions.
Figure 5:
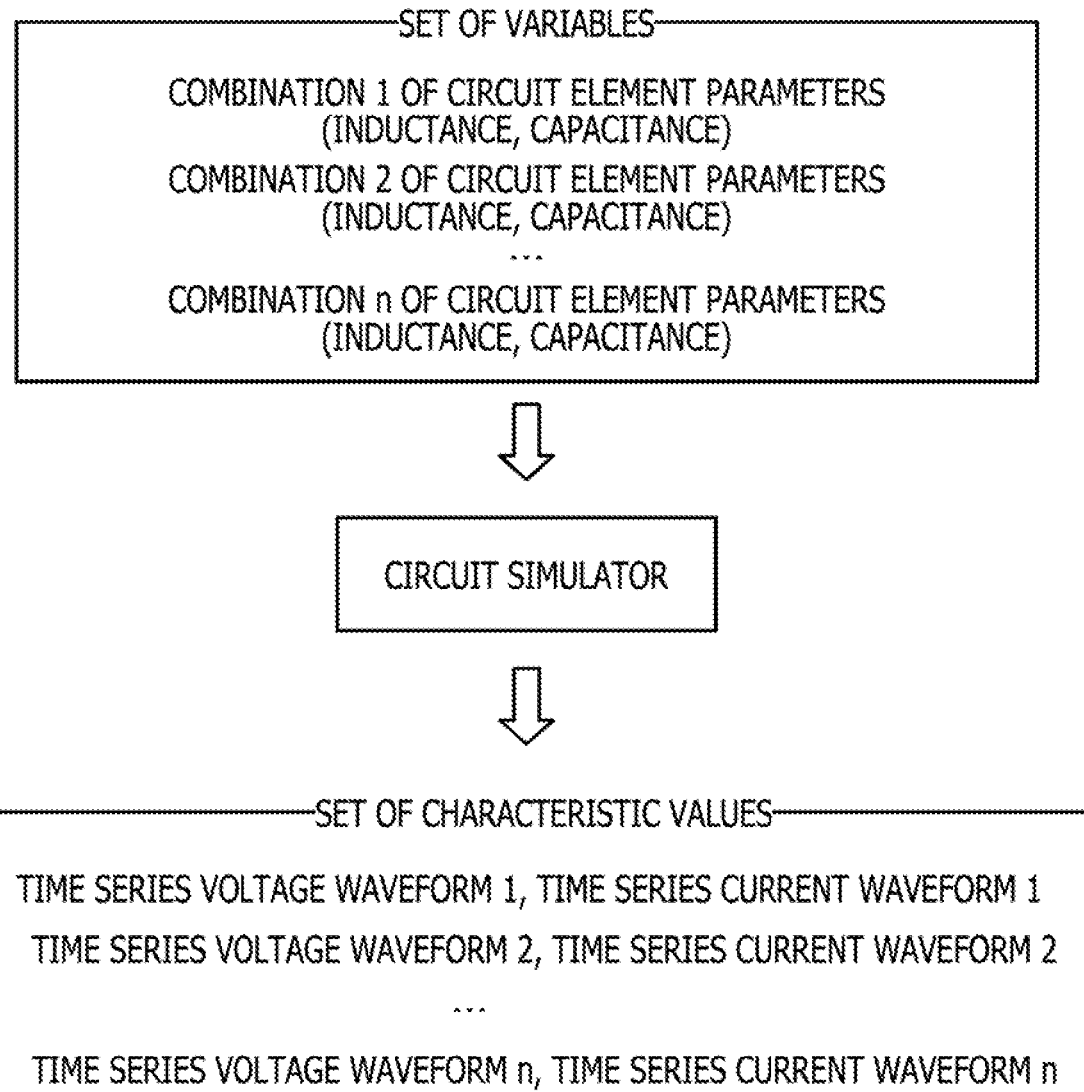
FIG. 5 is a diagram for explaining a generation example of a set of characteristic values.
Figure 6:
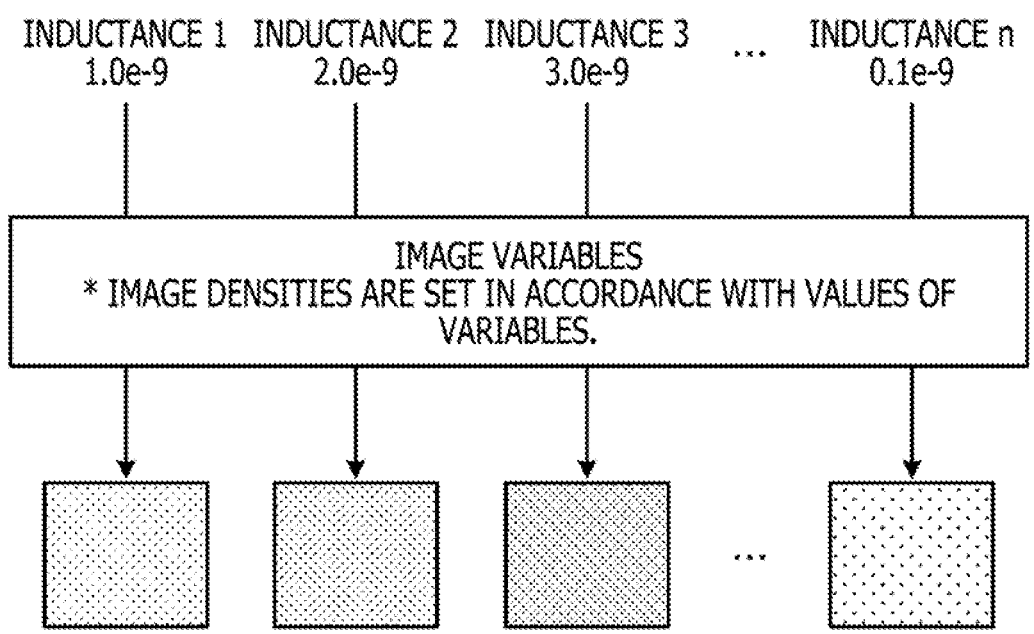
FIG. 6 is a diagram for explaining an example of imaging of set of variables.
Figure 7:
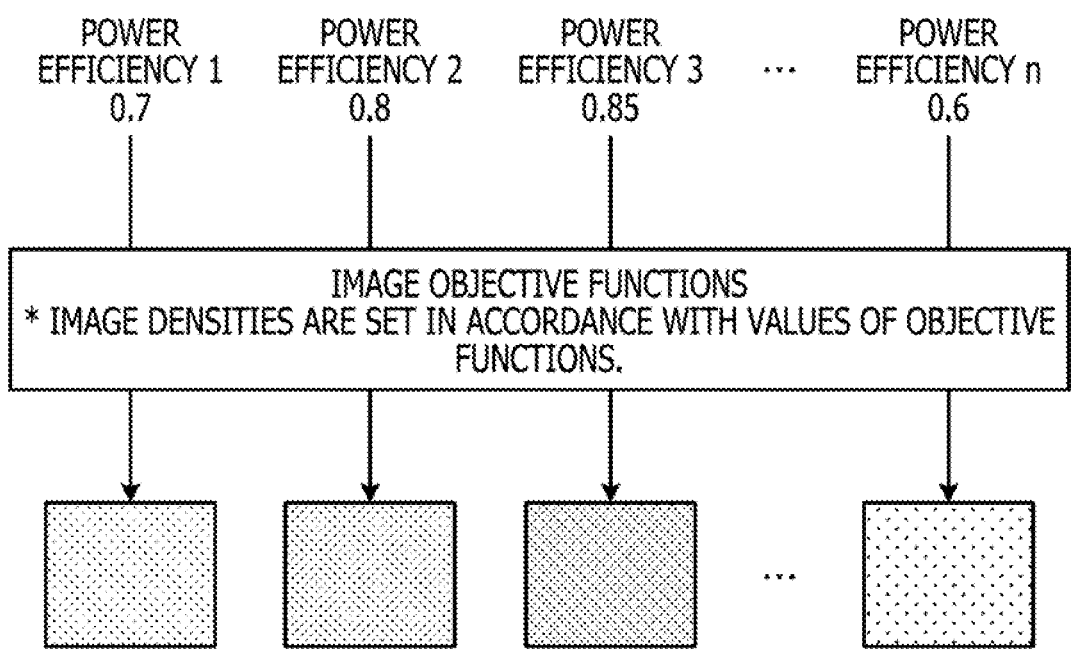
FIG. 7 is a diagram for explaining an example of aging of et of objective functions.
Figure 8:
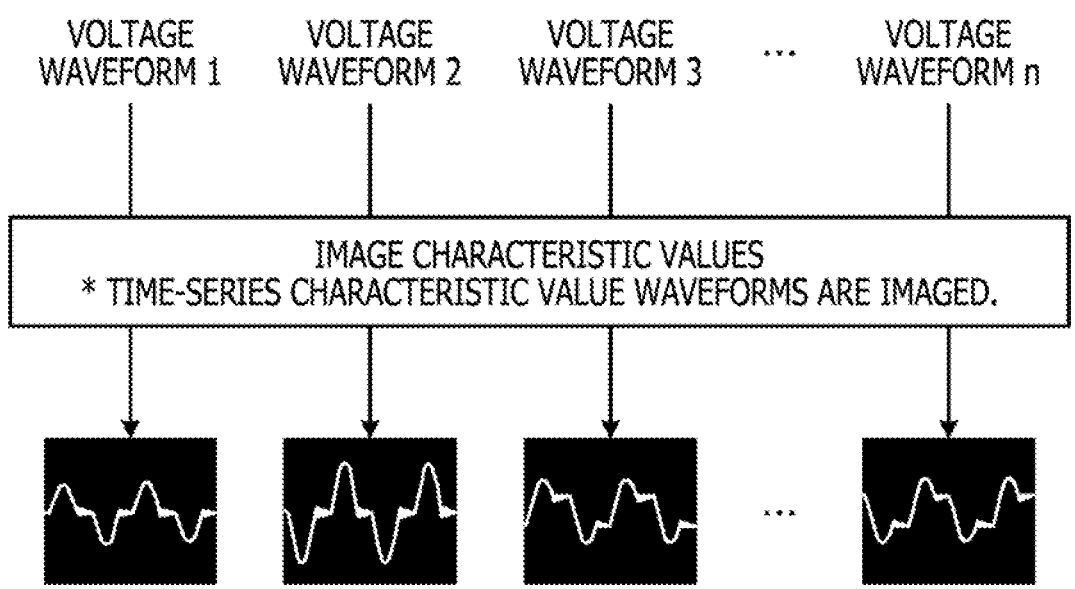
FIG. 8 is a diagram for explaining an example of imaging of t of characteristic values.

A specific example of the aforementioned training data generation will be described with reference to FIGS. 4 to 8. As an example, optimization of design parameters in a circuit design will be described. FIG. 4 is a diagram for explaining a generation example of a set of objective functions. FIG. 5 is a diagram for explaining a generation example of a set of characteristic values. FIG. 6 is a diagram for explaining an example of imaging of a set of variables. FIG. 7 is a diagram for explaining an example of imaging of a set of objective functions. FIG. 8 is a diagram for explaining an example of imaging of a set of characteristic values.

First, the training data generating unit 21 generates a set of variables, a set of objective functions, and a set of characteristic values. More specifically, for example, as illustrated in FIG. 4, the training data generating unit 21 generates n "combinations of circuit element parameters (inductance and capacitance) as a set of variables. The training data generating unit 21 inputs the set of variables to a circuit simulator such as LTspice (registered trademark) and generates n combinations of "power efficiency, power loss" as a set of objective functions.

In the same manner, as illustrated in FIG. 5, the training data generating unit 21 inputs a set of variables "combinations 1 to n of circuit element parameters (inductance, capacitance)" to the circuit simulator or the like and generates n combinations of "time series voltage waveforms (which may simply be called "voltage waveforms" hereinafter)" and "time series current waveforms (which may simply be called "current waveforms" hereinafter)" as a set of characteristic values.

Subsequently, the training data generating unit 21 images each of the set of variables, the set of objective functions, and the set of characteristic values and generates imaged variables, imaged objective functions, and imaged characteristic values. More specifically, for example, as illustrated in FIG. 6, the training data generating unit 21 images each of n inductances 1 to n, which is one of the variables, by setting an image density in accordance with the value of the variable. The capacitance, which is the other variable, is imaged in the same manner.

As illustrated in FIG. 7, the training data generating unit 21 images each of n power efficiencies 1 to n, which is one of the objective functions, by setting an image density in accordance with the value of the objective function. The power loss, which is the other objective function, is imaged in the same manner.

As illustrated in FIG. 8, the training data generating unit 21 images each of n voltage waveforms 1 to n, which is one of the characteristic values, such that the waveform is indicated. The current waveform, which is the other characteristic value, is imaged in the same manner.

Referring back to FIG. 2, the learning unit 22 is a processing unit that learns the VAE by using training data stored in the training data DB 14. More specifically, for example, the learning unit 22 inputs "imaged variables, imaged objective functions, imaged characteristic values" which are training data to the VAE and learns the VAE. After the learning is completed, the learning unit 22 stores, as learning results, the learned VAE or the parameters included in the learned VAE in the storage unit 12. The time to complete the learning may be set at any time, such as a time at which learning by using a predetermined or higher number of training data pieces is completed or a time at which the reconstruction error reaches less than a threshold.

Figure 9:
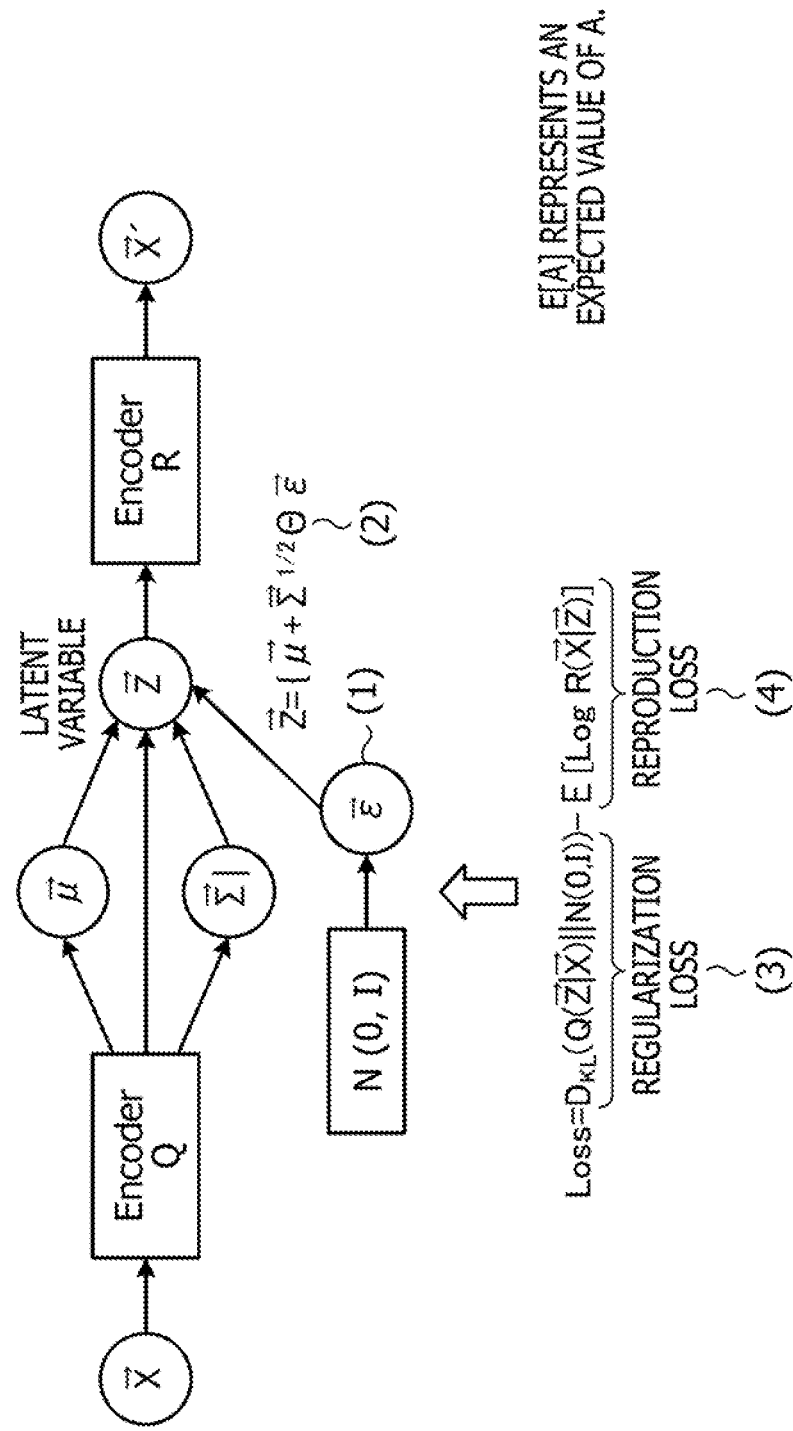
FIG. 9 is a diagram for explaining learning of a variational autoencoder (VAE)

The VAE to be learned will be described. FIG. 9 is a diagram for explaining the learning of the VAE. In explaining FIG. 9, a vector X, for example, is simply called "X" as appropriate. As illustrated in FIG. 9, the VAE has an encoder and a decoder. When input data (vector X) is input to the encoder, the encoder generates parameters μ (vector) and Σ (vector) having normal distributions followed by a latent variable z. In other words, for example, the encoder compresses a characteristic of the input data (vector X), outputs a mean μ and a distribution Σ of an N-dimensional Gaussian distribution and, based on the two, acquires a latent variable Z by sampling. The decoder reproduces the input data from the sampled latent variable. The VAE adjusts weights for neural networks of the encoder and the decoder by error back-propagation using a difference between the input data and the reproduced data.

More specifically, for example, (1) in FIG. 9 indicates an n-dimensional vector sampled randomly from an n-dimensional standard normal distribution $N_n(0,I)$. (2) in FIG. 9 indicates an element-wise product (Hadamard product) of the two vectors, and the vector Z is equivalent to the n-dimensional vector sampled randomly from the n-dimensional normal distribution $N_n$ (vector μ, vector Σ) of the mean μ and the distribution Σ.

$D_{KL}(P\|Q)$ indicated by (3) in FIG. 9 is a Kullback-Leibler distance (which may be called "KL distance" hereinafter) of two probability distributions P and Q and is a scale for measuring a distance between P and Q. The KL distance is equal to zero when P and Q are completely matched and otherwise has a positive value. Because of minimization of the regularization loss, images having a higher similarity are decoded to close points in the latent space. (4) in FIG. 9 indicates a mean squared error, a cross entropy error or the like between the input X and the output X' as an approximation of the reproduction loss. The cross entropy error is used in an example of a circuit design, which will be described below. E[A] represents an expected value of A.

In the VAE designed as described above, the parameters in the encoder and the decoder are learned such that Loss is minimized with respect to a set $\xi=\{X_1, X_2, \ldots X_n\}$ of the training data. The encoder and the decoder include a hierarchical neural network (NN). The process for adjusting parameters of the weight and bias of the NN for minimization of Loss is a learning process of the VAE.

Referring back to FIG. 2, the set generating unit 23 is a processing unit that generates a sampling set by using the learned VAE. For example, the set generating unit 23 gives (inputs) training data stored in the training data DB 14 to the learned VAE which has been learned by the learning unit 22 and generates a solution space in which objective functions with higher similarities are placed in a concentrated manner (parts with higher objective functions and parts with low objective functions are concentrated). The set generating unit 23 generates a sampling set similar to the objective function desired by a user in the generated solution space and outputs it to the acquiring unit 24.

The acquiring unit 24 is a processing unit that acquires an optimum solution for an objective function by using a learned VAE. For example, the acquiring unit 24 performs decoding by using a learned VAE on the sampling set generated by the set generating unit 23 to reproduce sets of imaged variables, imaged objective functions and imaged characteristic values from the sampling set. The acquiring unit 24 converts the sets of the imaged variables, imaged objective functions and imaged characteristic values into numbers and acquires a combination of an objective function, a variable and a characteristic value, which is an optimum solution. The acquiring unit 24 stores the acquired optimum solution in the storage unit 12, displays it on a display, or transmits it to an administrator terminal.

[Processing Flow]

Next, flows of processes to be executed in the processing units described above will be described. An overall process and processes of generation of training data and acquisition of an optimum solution will be described.

(Overall Process)

Figure 10:
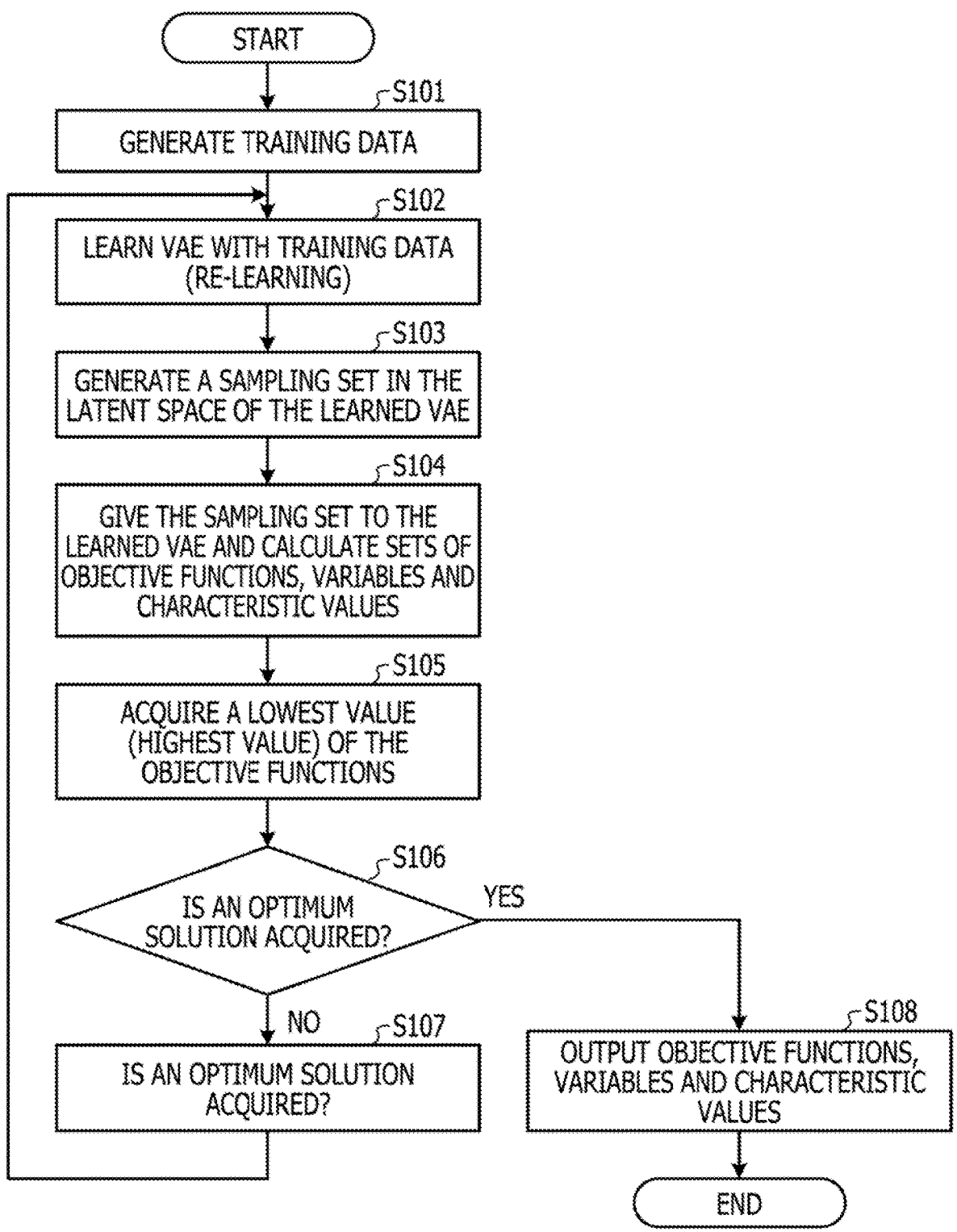
FIG. 10 is a flowchart illustrating a flow of the overall process.

FIG. 10 is a flowchart illustrating a flow of the overall process. As illustrated in FIG. 10, when the process starts, the training data generating unit 21 executes generation of training data (S101), and the learning unit 22 executes learning of the VAE with the training data (S102).

Subsequently, the set generating unit 23 generates a sampling set in the latent space of the learned VAE (S103). The acquiring unit 24 gives the sampling set to the learned VAE and thus calculates sets of objective functions, variables and characteristic values (S104) and acquires a lowest value (or a highest value) of the objective functions (S105).

If an optimum solution may not be acquired (No in S106), the training data generating unit 21 generates training data for re-learning by performing resetting such as increasing the fluctuation range of the variables (S107). After that, the processing in S102 and subsequent steps is repeated.

On the other hand, if an optimum solution may be acquired (Yes in S106), the acquiring unit 24 outputs the acquired sets of the objective functions, variables and characteristic values (S108).

(Process of Generation of Training Data)

Figure 11:
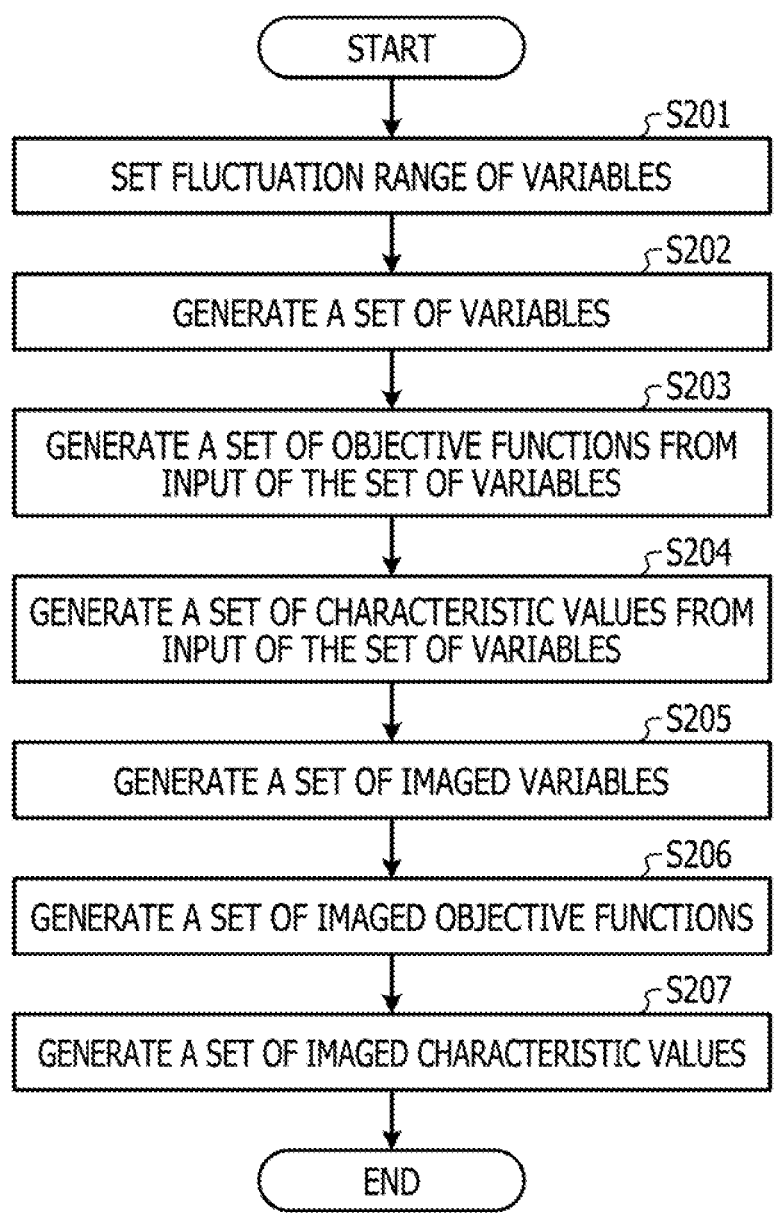
FIG. 11 is a flowchart illustrating a flow of a process of generation of training data.

FIG. 11 is a flowchart illustrating a flow of a process of generation of training data. As illustrated in FIG. 11, the training data generating unit 21 sets fluctuation ranges of the variables (S201) and generates a set of the variables (S202).

Subsequently, the training data generating unit 21 generates a set of objective functions by performing mathematical calculations, measurements and the like on the set of variables input thereto (S203). The training data generating unit 21 generates a set of characteristic values by performing mathematical calculations, measurements and the like on the set of variables input thereto (S204).

The training data generating unit 21 generates a set of imaged variables from the set of variables (S205), generates a set of imaged objective functions from the set of objective functions (S206) and generates a set of imaged characteristic values from the set of characteristic values (S207).

(Process of Acquisition of Optimum Solution)

Figure 12:
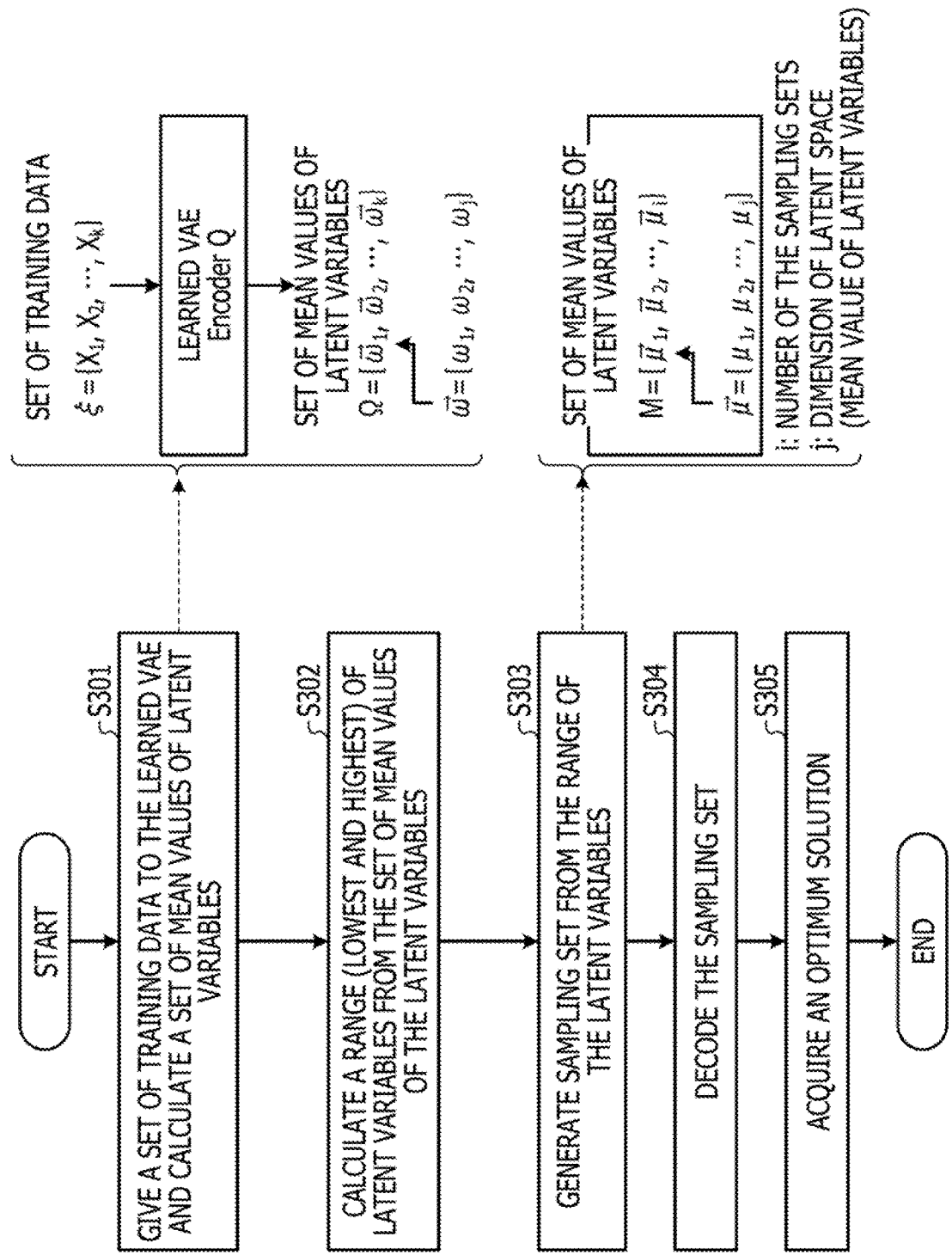
FIG. 12 is a flowchart illustrating a flow a process of acquisition of an optimum solution.

FIG. 12 is a flowchart illustrating a flow of a process of acquisition of an optimum solution. As illustrated in FIG. 12, the set generating unit 23 gives a set of training data to the learned VAE and calculates a set of mean values of latent variables (S301). For example, the set generating unit 23 inputs a set of training data $\xi=\{X_1, X_2, \ldots X_n\}$ to the encoder in the learned VAE and obtains a set Q of mean values of latent variables.

Subsequently, the set generating unit 23 calculates a range (lowest and highest) of the latent variables from the set of mean values of the latent variables (S302). The set generating unit 23 generates a sampling set from the range of latent variables (S303). For example, the set generating unit 23 generates a sampling set M of the range corresponding to the objective function desired by a user. In this case, the character "i" is the number of sampling sets, and the character "j" is the dimension of the latent space (mean values of the latent variables). After that, the acquiring unit 24 decodes the sampling set (S304) and acquires an optimum solution (S305).

Figure 13:
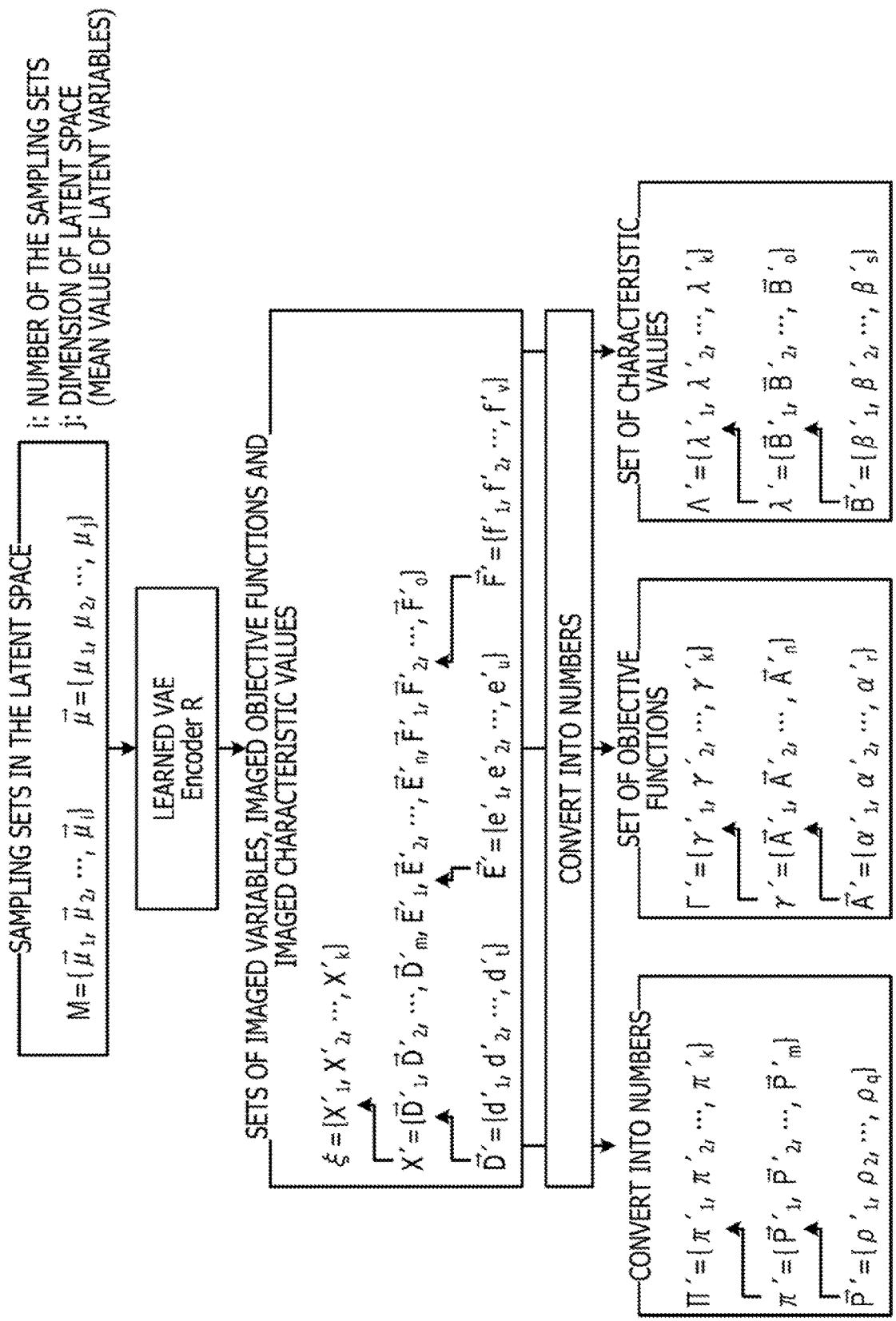
FIG. 13 is a diagram for explaining calculation of sets f objective functions, variables and characteristic values.

FIG. 13 is a diagram for explaining calculation of sets of objective functions, variables, and characteristic values. As illustrated in FIG. 13, the acquiring unit 24 inputs the sampling set M in the latent variables to the decoder in the learned VAE and obtains a set $\xi=\{X'_1, X'_2, \ldots X'_n\}$ of imaged variables $D'(d'_1$ to $d'_n)$, imaged objective functions $E'(e'_1$ to $e'_n)$ and imaged characteristic values $F'(f'_1$ to $f'_n)$ as a result of reproduction. X' includes $\{D'_{1\ to\ m}, E'_{1\ to\ n}, F'_{1\ to\ o}\}$. The acquiring unit 24 converts the sets of the imaged variables D', the imaged objective functions E' and imaged characteristic values F' into numbers and generates a set Π of variables $n'_1$ to $n'_n$, a set Γ of objective functions $\gamma'_1$ to $\gamma'_n$, and a set Λ of characteristic values $\Lambda'_1$ to $\Lambda'_n$.

SPECIFIC EXAMPLE

Next, a specific example of the acquisition of an optimum solution described above will be described. As an example, optimization of design parameters in a circuit design of an LLC current resonance circuit will be described.

(Circuit Diagram)

Figure 14:
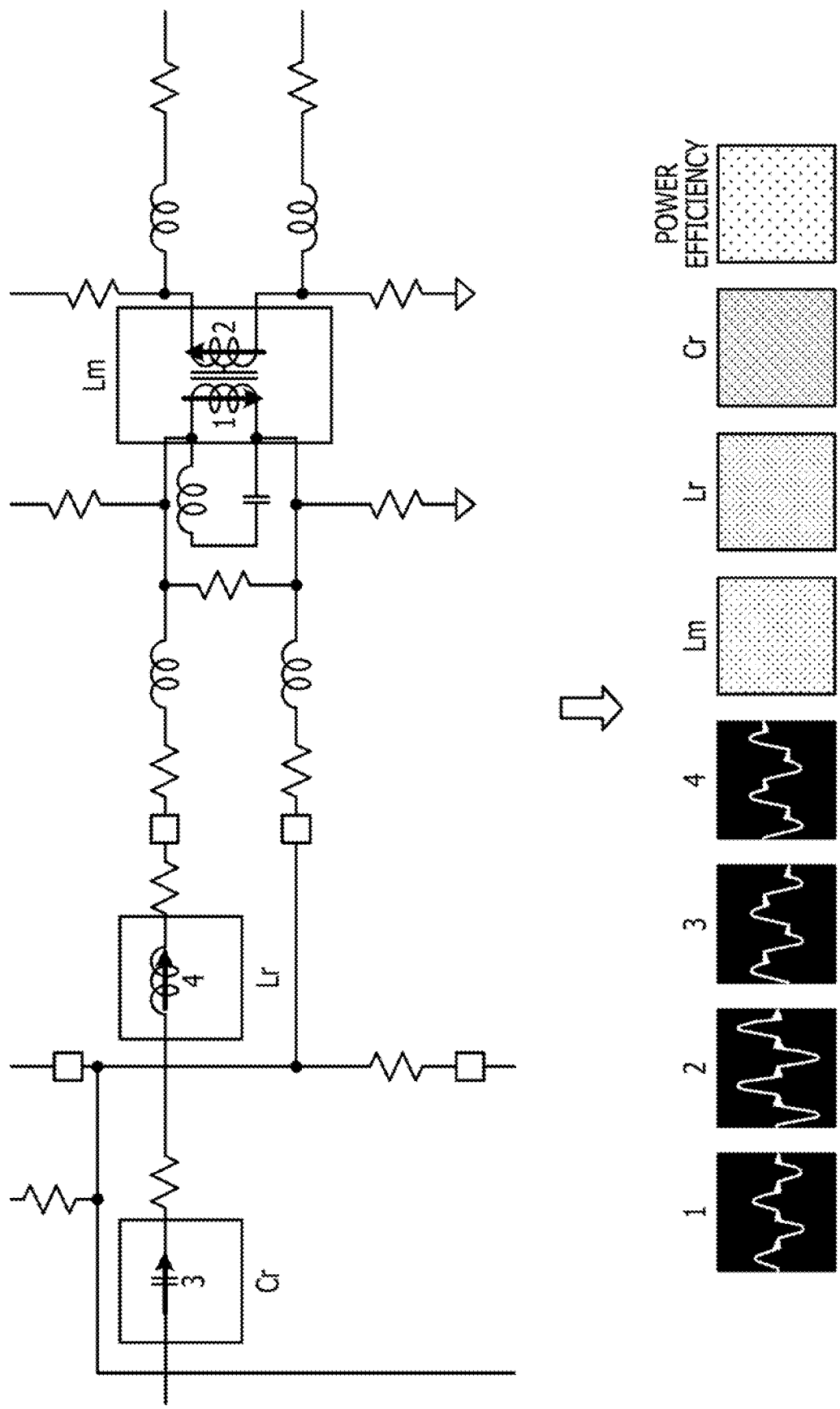
FIG. 14 is a diagram illustrating a circuit diagram used in a specific example.

A circuit diagram to be designed will be described first. FIG. 14 is a diagram illustrating a circuit diagram used in a specific example. As illustrated in FIG. 14, an LLC current resonance circuit having two reactors Lr and Lm and a capacitor Cr will be described as an example. As illustrated in FIG. 14, learning and optimum solution acquisition are executed by using image data of node waveforms at four observation points and three parameters (Cr, Lr, Lm). The four observation points correspond to the characteristic values indicating phenomena, the three parameters correspond to the variables, and the power efficiency corresponds to the objective function.

(Learning Data)

Next, learning data to be used for learning of the VAE for acquiring an optimum combination of design parameters will be described. Waveforms at four observation points 1 to 4 sensitive to a change of the circuit parameters are given as multichannel image data, and a highest value of the output current that is largely influenced by a change of the power efficiency is used. It is predicted that the latent space varies in accordance with the output current.

The parameter values of the circuit parameters (Cr, Lr, Lm) that are sensitive to the node waveforms and the power efficiency and relatively easily allow design changes are given as multichannel image data (all pixels are normalized with the parameter values and the highest value). The power efficiency is given as multichannel image data (all pixels are power efficiency). Each of the image sizes is 120×120. From this, the number of channels is equal to the number of observation points+the number of parameters+power efficiency=4+3+1=8. The number of learning data pieces is equal to 961. Lm is a designed value, and Lr and Cr are changed in steps of 2% in the range of −30% through +30% from the designed values.

In this environment, according to the specific example, a simulation is executed by randomly extracting arbitrary points in the latent space and adopting the inferred circuit parameter combination as design parameters, and the failure/no-failure of the circuit parts optimization is checked.

(VAE)

Figure 15:
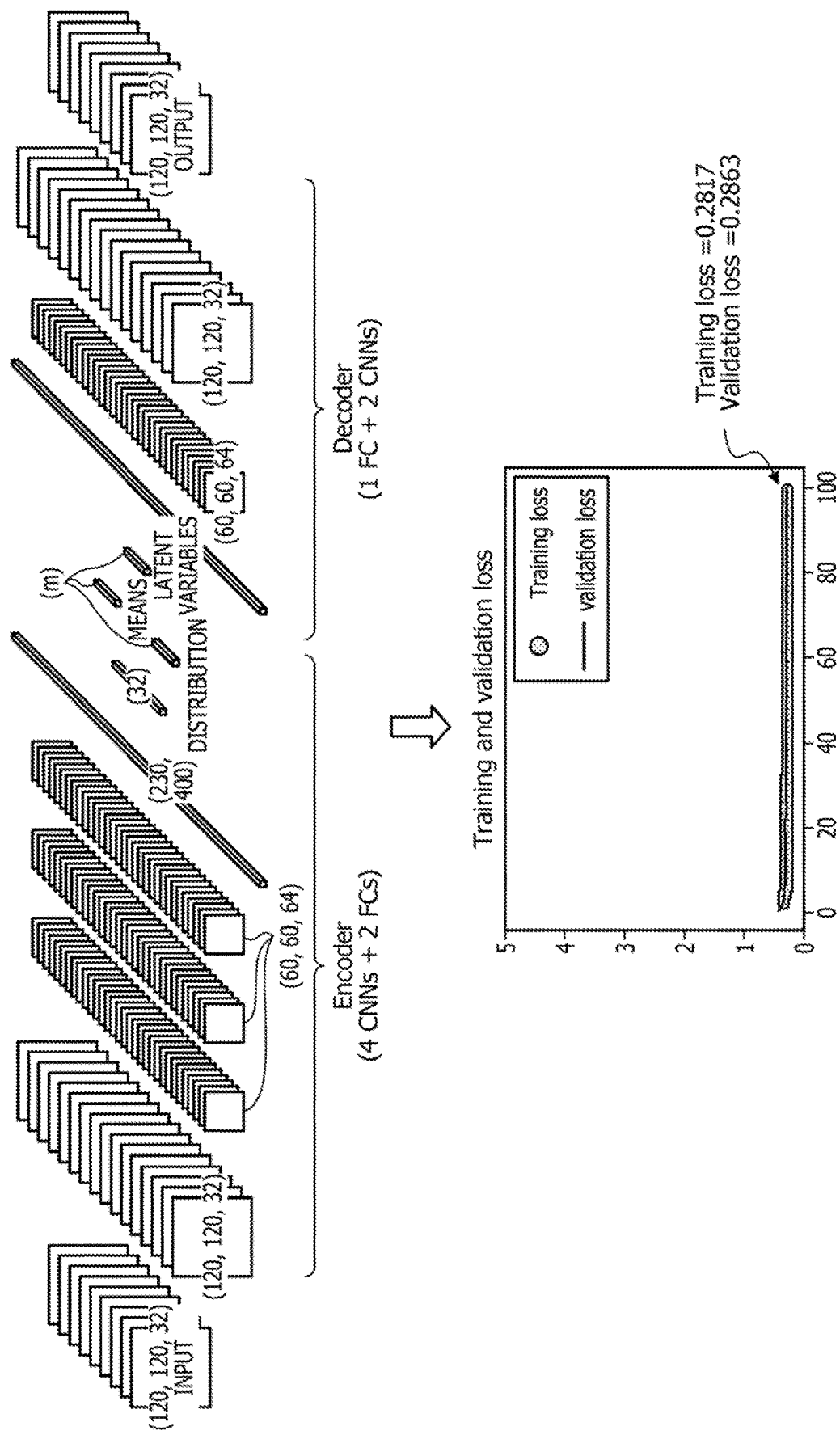
FIG. 15 is a diagram for explaining a structure of a VAE generating a latent space and losses.

Next, the VAE to be learned will be described. FIG. 15 is a diagram for explaining a structure of a VAE generating a latent space and losses. As illustrated in FIG. 15, the VAE to be learned includes an encoder having four convolutional neural networks (CNNs) and two full-connected (FC) layers and a decoder having one FC layer and two CNNs. The number of learning data pieces is equal to the square of the steps of each parameter=$(31)^2$=961, and 96 that is 10% of them is used as validation data, and the remaining 865 data pieces are used as training data. The batch size for the learning is 16, and the number of epochs is 100. Nadam is used as an optimizer that is an optimization algorithm. It is assumed that the training time for one epoch is 3 seconds.

The lower part of FIG. 15 illustrates losses of the learned VAE which has learned in the condition as described above. FIG. 15 has a horizontal axis indicating the number of epochs for learning and a vertical axis indicating loss. As illustrated in FIG. 15, the loss (training loss) when training data is used is 0.2817, and the loss (validation loss) when validation data is used is 0.2863. It is understood that the VAE may have learned sufficiently because of the learning conditions above.

Figure 16:
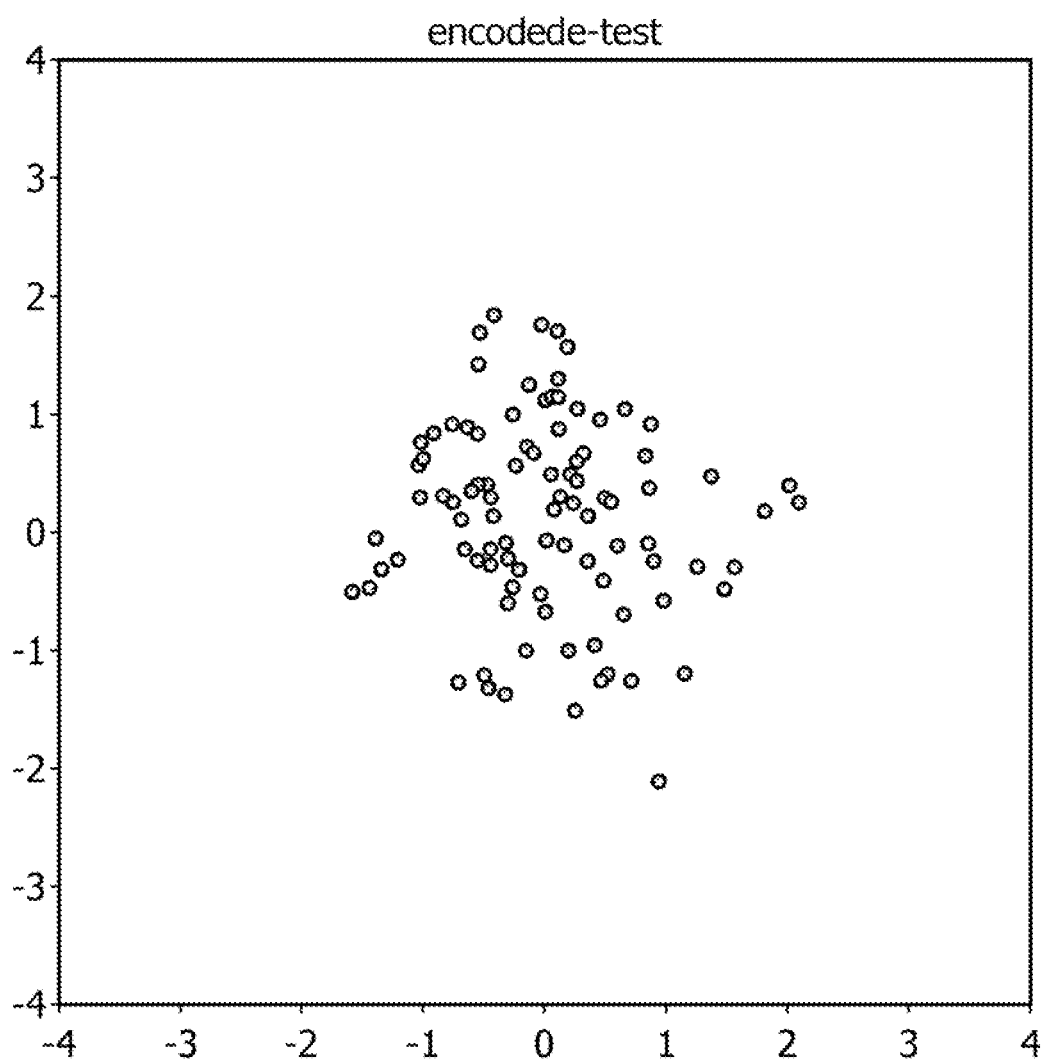
FIG. 16 is a diagram for explaining a distribution of validation data in a latent space.

FIG. 16 illustrates a distribution of the validation data used for the validation, FIG. 16 is a diagram for explaining a distribution of the validation data in a latent space. As illustrated in FIG. 16, because the points in the latent space are distributed about the latent space (0,0) and the distribution is uniform without deviations, it may be determined that the fluctuation range of the learning data may be expressed and that the reliability of the validation result illustrated in FIG. 15 is also high.

(Reproduction Result)

Figure 17:
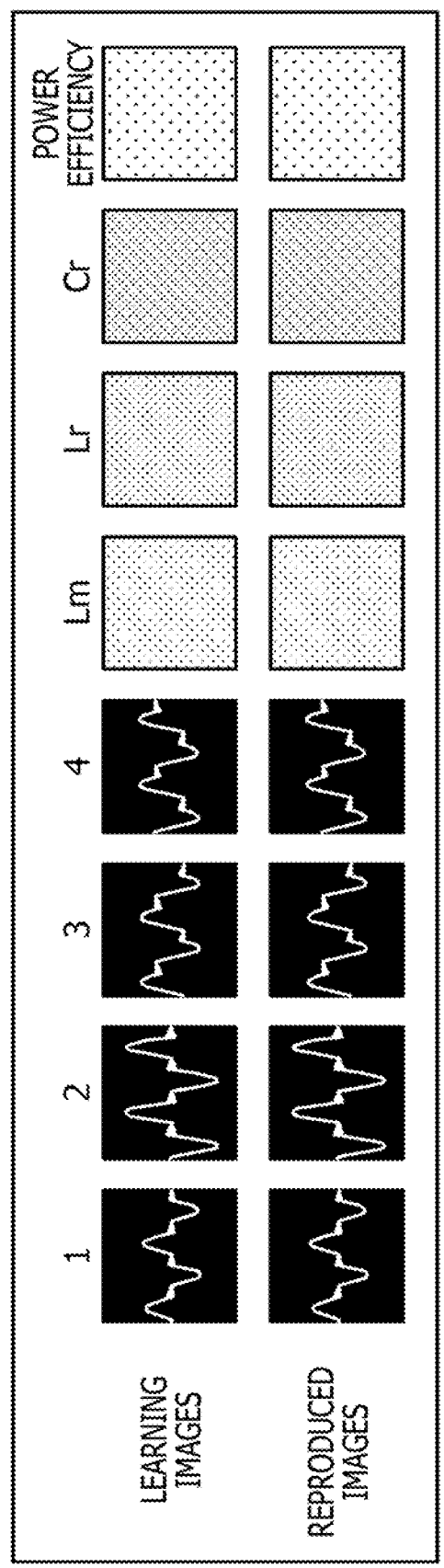
FIG. 17 is a diagram for explaining reproduced images of learning data.
Figure 18:
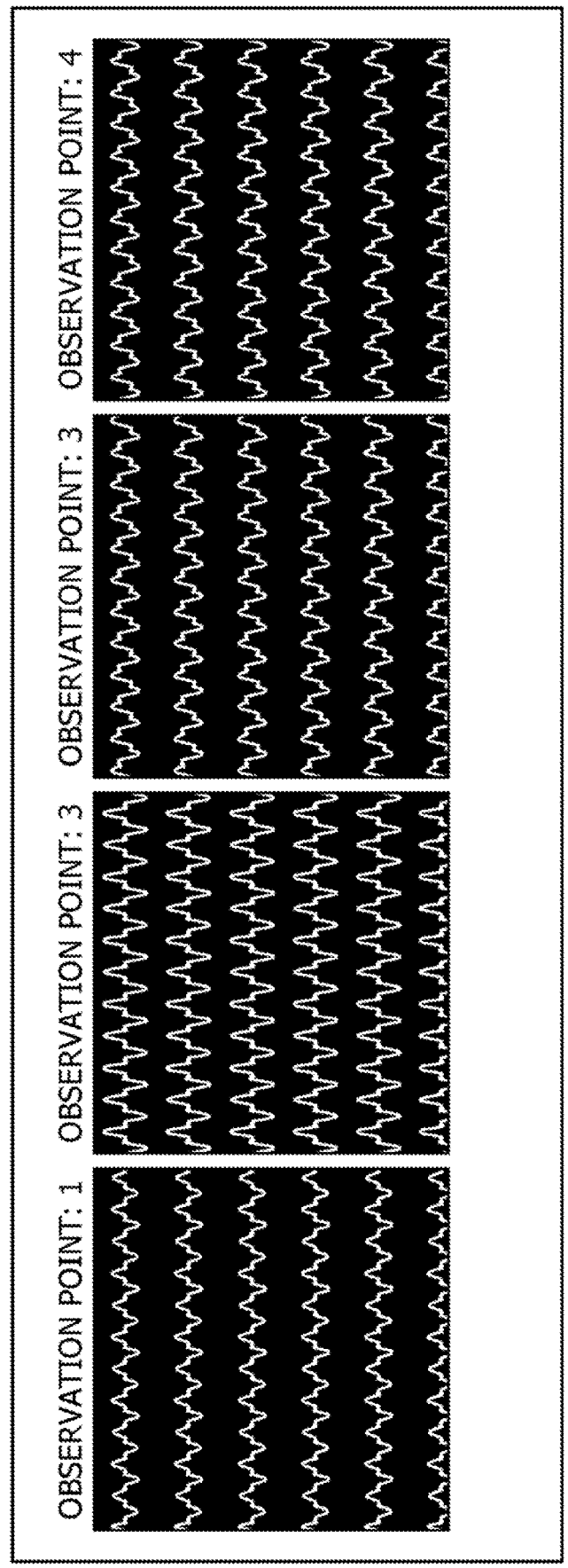
FIG. 18 is a diagram for explaining reproduced images of node waveforms in a latent space.
Figure 19:
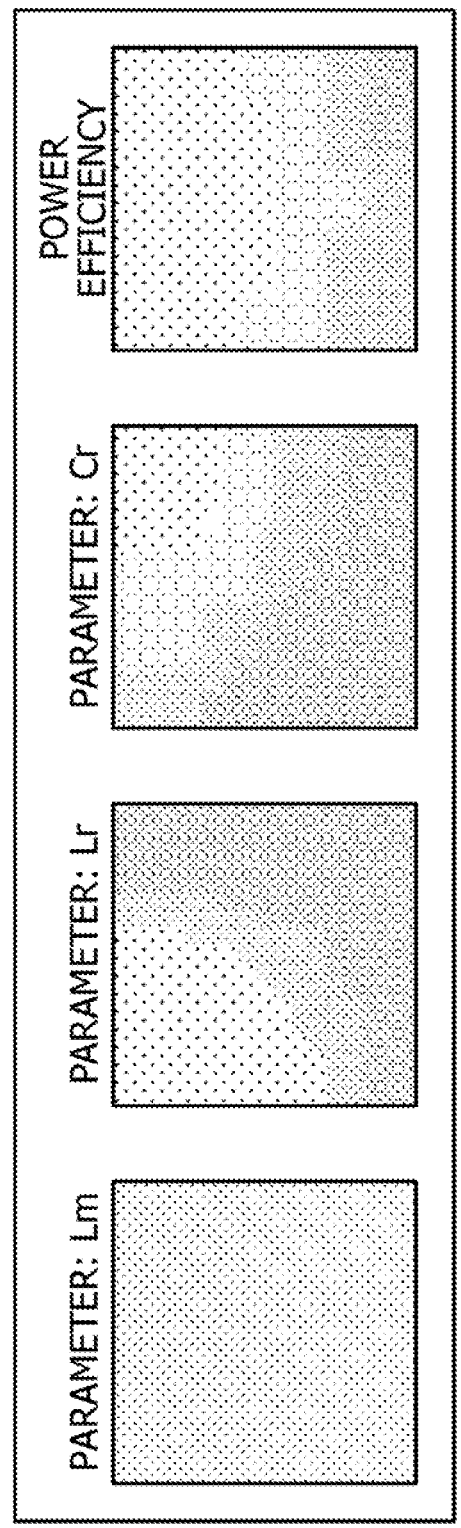
FIG. 19 is a diagram for explaining reproduced images of parameters and a power efficiency in a latent space.

Next, with reference to FIGS. 17 to 19, a reproduction result by the VAE will be described. FIG. 17 is a diagram for explaining reproduced images of learning data. FIG. 18 is a diagram for explaining reproduced images of node waveforms in a latent space. FIG. 19 is a diagram for explaining reproduced images of parameters and a power efficiency in a latent space.

FIG. 17 illustrates images (learning images) corresponding to eight learning data pieces of four observation points, three parameters and a power efficiency and reproduced images acquired by inputting the learning images. As illustrated in FIG. 17, there is a tendency that the learning images and reproduced images of the observation point waveforms, the parameters and the power efficiency are matched, and it is understood that the VAE may have sufficiently learned.

FIG. 18 illustrates reproduced images of waveforms observed at observation points 1 to 4. The time for each of the observation point waveforms is equal to two cycles, and the amplitude is corrected in an interval from the lowest amplitude to the highest amplitude. As illustrated in FIG. 18, the reproduced image of each of the observation point waveforms has small fluctuations of the continuous waveform. However, because the waveform fluctuations of the learning data are small, it may be difficult to completely grasp whether the characteristic amounts of the observation point waveforms may be learned, FIG. 19 illustrates reproduced images of the three parameters (Cr, Lr, Lm) and the power efficiency. Each of the parameters is normalized by its highest value, and the power efficiency is normalized by the range from the lowest one to the highest one. As illustrated in FIG. 19, the reproduced image of each of the parameters exhibits approximately continuous parameter fluctuations, and it may be determined that the VAE may learn the characteristic amounts of the parameters. Also, the reproduced image of the power efficiency exhibits approximately continuous parameter fluctuations, and it may be determined that the VAE may learn the characteristic amount of the power efficiency.

(Research and Validation of Latent Space)

Next, a result of validation of the learned VAE by inputting training data (input data) to the learned VAE and comparing a reproduction result acquired by reproducing the input data and the input data will be described.

Figure 20:
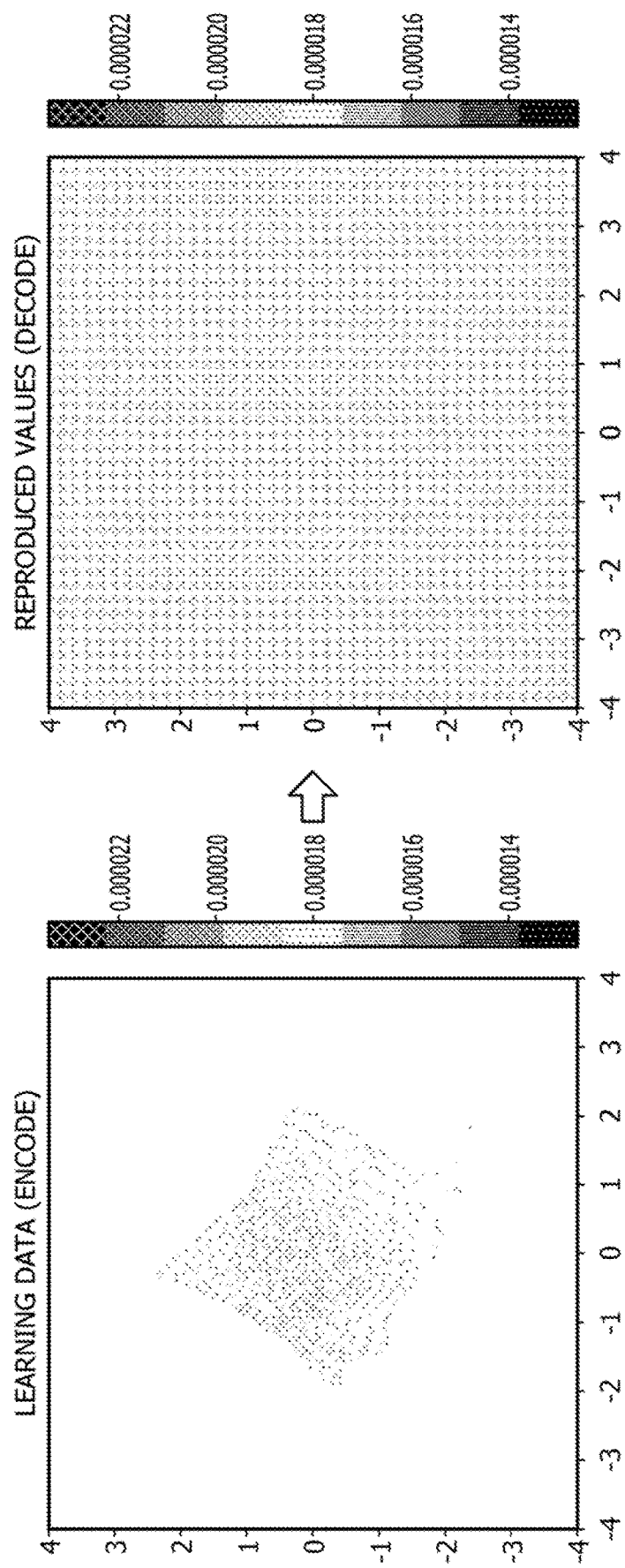
FIG. 20 is a diagram or explaining a distribution of an Lm parameter in a latent space.
Figure 21:
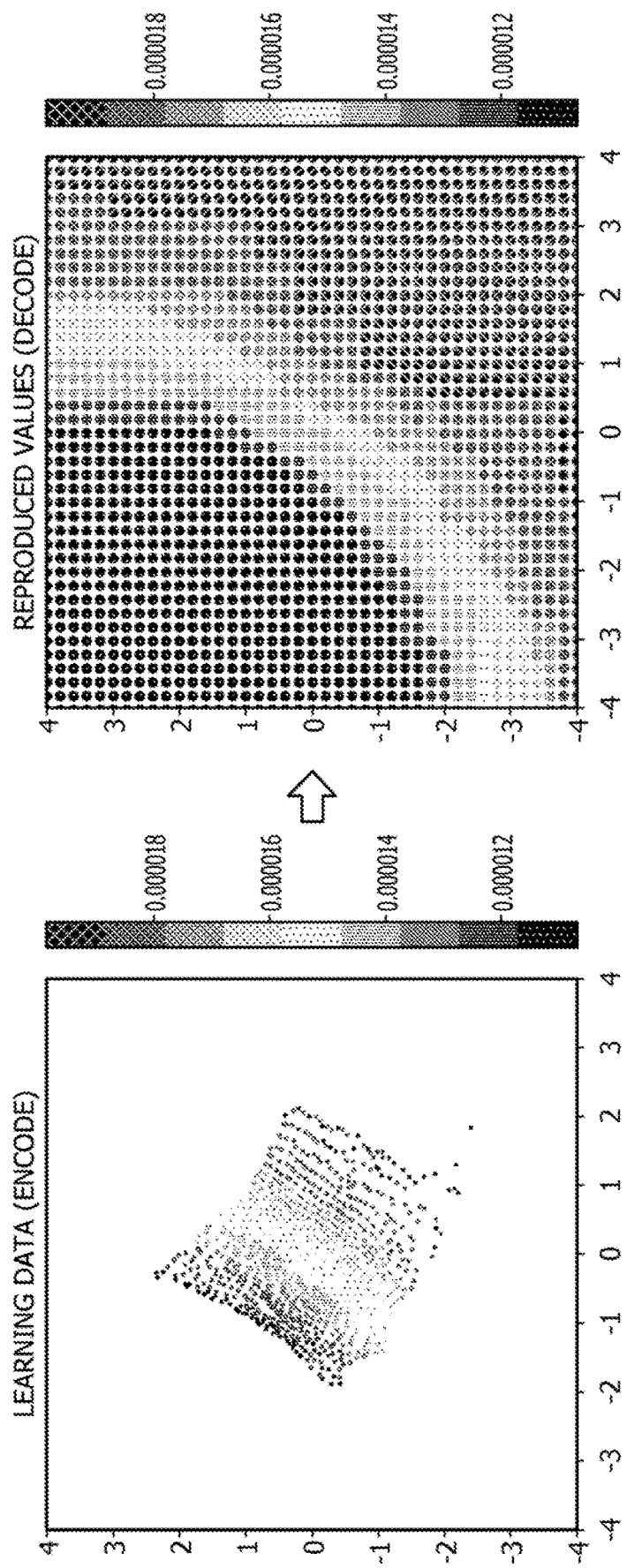
FIG. 21 is a diagram for explaining a distribution of an Lr parameter in a latent space.
Figure 22:
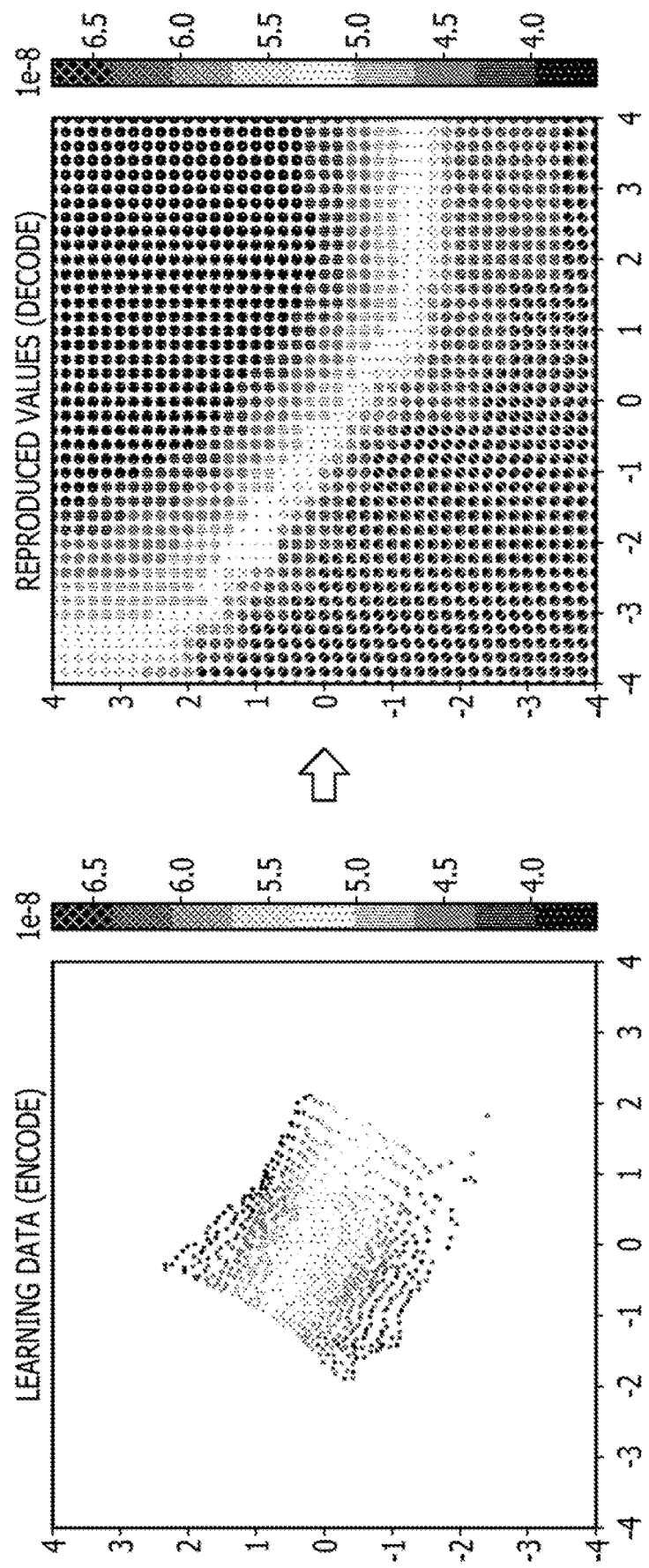
FIG. 22 is a diagram for explaining a distribution of a Cr parameter a latent space.
Figure 23:
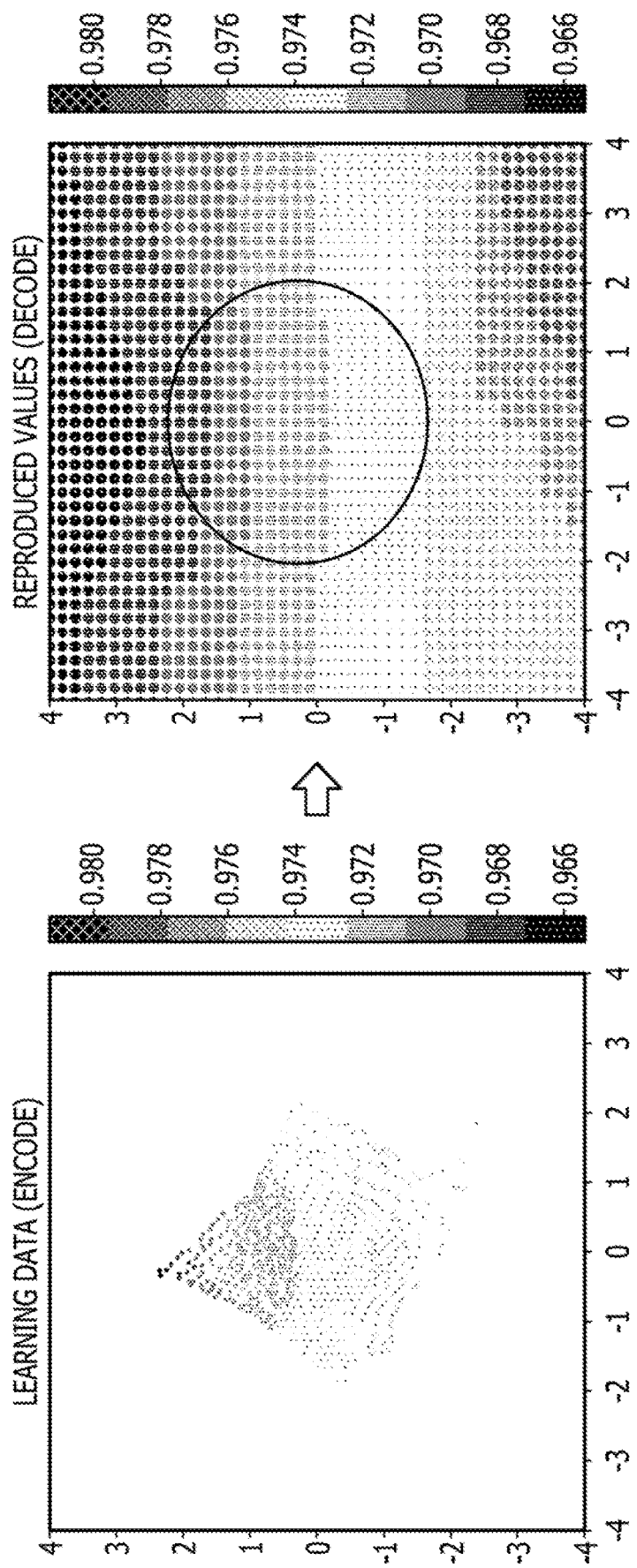
FIG. 23 is a diagram for explaining a distribution of a power efficiency in a latent space.

First, validation of distributions of the parameters will be described. FIG. 20 is a diagram for explaining a distribution of the Lm parameter in a latent space. FIG. 21 is a diagram for explaining a distribution of the Lr parameter in a latent space, FIG. 22 is a diagram for explaining a distribution of the Cr parameter in a latent space. FIG. 23 is a diagram for explaining a distribution of the power efficiency in a latent space. For each of the parameter values and the power efficiency, a mean value of all pixels of the reproduced image is adopted. FIGS. 20 to 23 illustrate distributions of learning data exhibiting where the learning data are actually categorized in the latent space and reproduced values exhibiting what kind of values the points sampled (extracted) over the grid from the latent space have. The vertical axes in FIGS. 20 to 23 are two-dimensional coordinates in a solution space formed over the latent space, and the horizontal axes are one-dimensional coordinates of the solution space formed over the latent space. The vertical numerical values given by the distributions are dimensions in the solution space, and examples of two-dimensional values are illustrated here. In this case, (0,0) is the center of the solution space.

As illustrated in FIG. 20, comparing the distribution of the learning data of the parameter Lm input to the VAE and the reproduced values of the parameter Lm reproduced by the learned VAE, the tendencies of the distributions of the learning data and the reproduced values are approximately the same tendencies (fixed values), and it may be determined that the distribution of the parameter Lm may be learned.

As illustrated in FIG. 21, comparing the distribution of the learning data of the parameter Lr input to the VAE and the reproduced values of the parameter Lr reproduced by the learned VAE, the tendencies of the distributions of the learning data and the reproduced values are approximately the same tendencies (fixed values), and it may be determined that the distribution of the parameter Lr may be learned.

As illustrated in FIG. 22, comparing the distribution of the learning data of the parameter Cr input to the VAE and the reproduced values of the parameter Cr reproduced by the learned VAE, the tendencies of the distributions of the learning data and the reproduced values are approximately the same tendencies (fixed values), and it may be determined that the distribution of the parameter Cr may be learned.

As illustrated in FIG. 23, comparing the distribution of the learning data of the power efficiency input to the VAE and the reproduced values of the power efficiency reproduced by the learned VAE, the tendencies of the distributions of the learning data and the reproduced values are approximately the same tendencies (fixed values), and it may be determined that the distribution of the power efficiency may be learned.

(Acquisition of Design Parameter Combination)

Next, a specific example will be described in which a combination of optimum design parameters is acquired by inputting training data to the learned VAE, thus generating a sampling set over a latent space and reproducing the sampling set.

Figure 24:
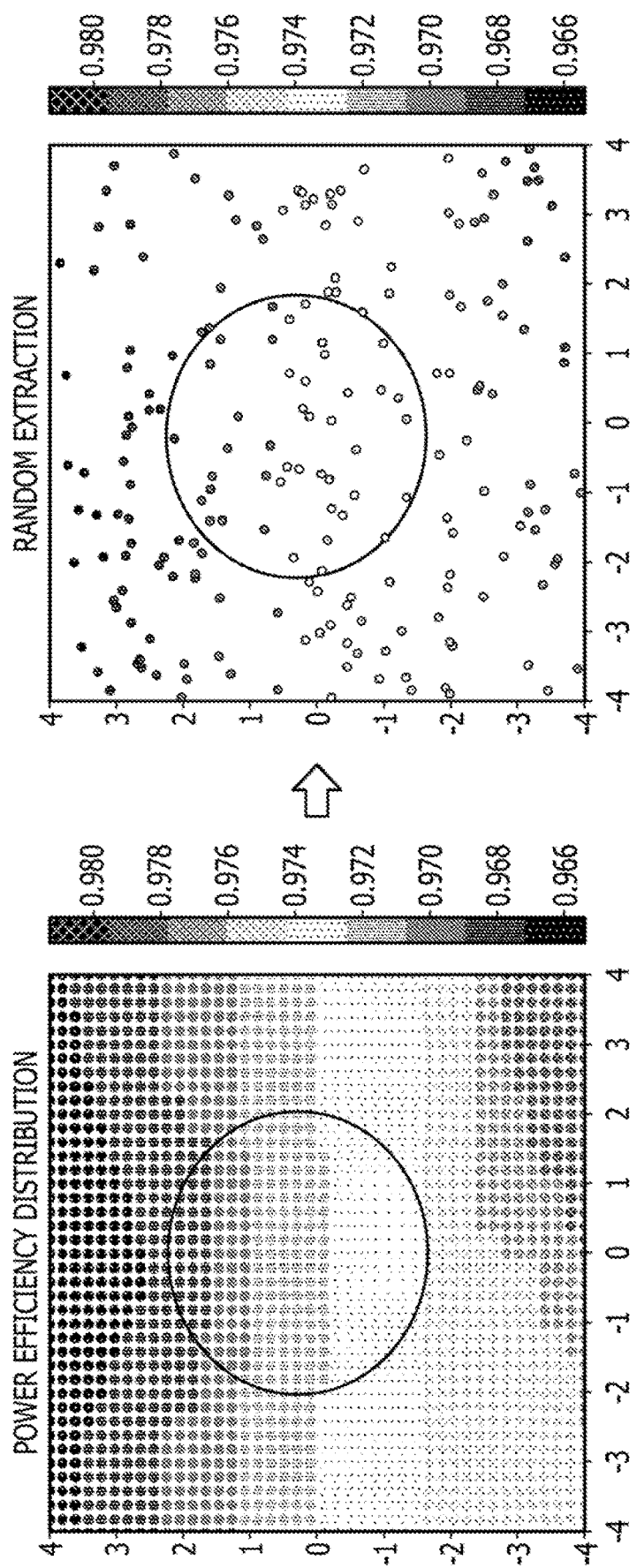
FIG. 24 is a diagram for explaining a power efficiency distribution and random extraction.

FIG. 24 is a diagram for explaining a power efficiency distribution and random extraction. As illustrated in FIG. 24, 200 arbitrary points are randomly extracted from the power efficiency distribution. By using the extracted points, the parameters are estimated, and the design parameters are acquired.

Figure 25:
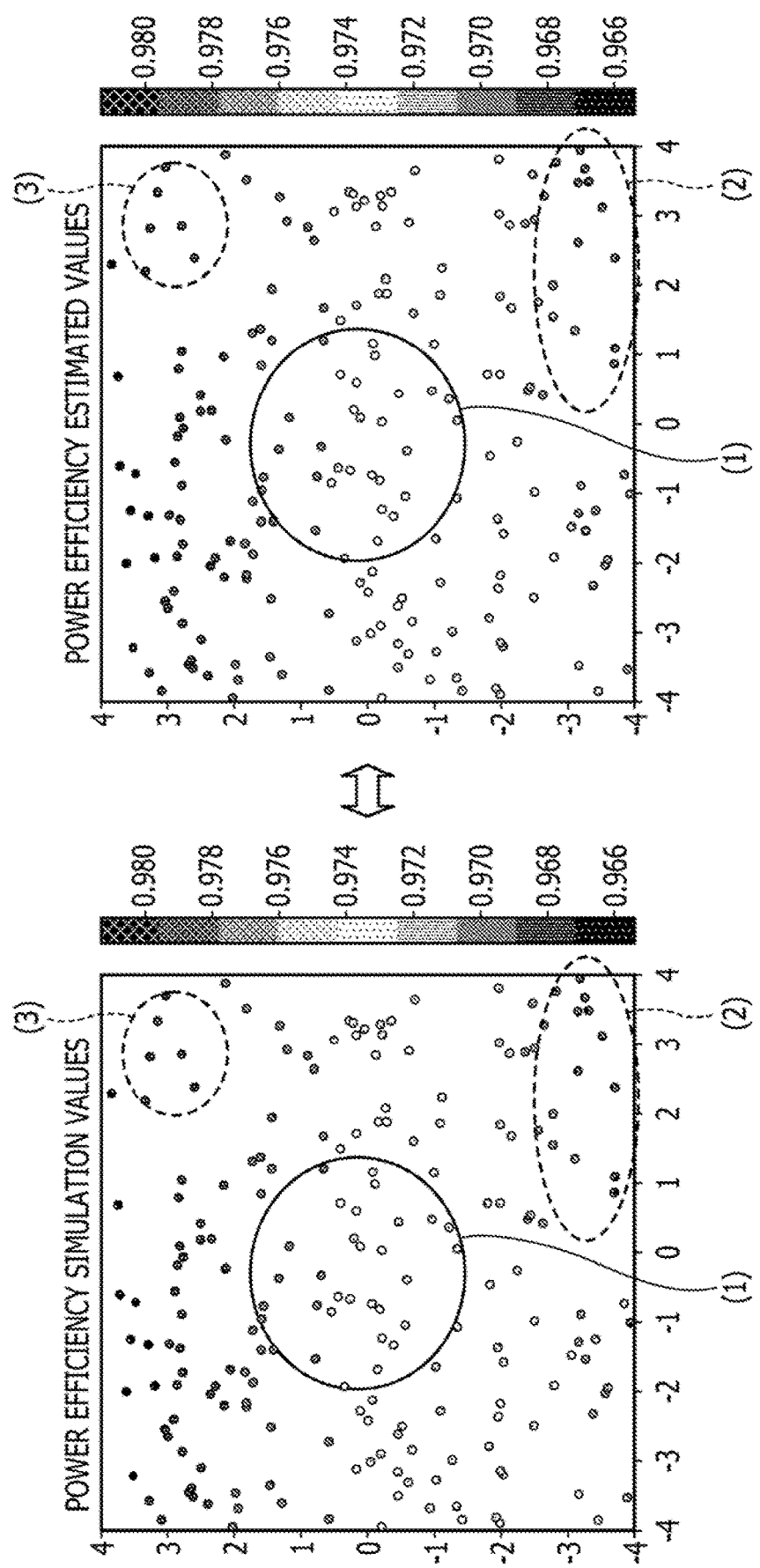
FIG. 25 is a diagram for explaining simulation values and estimated values of a power efficiency distribution.

Next, a comparison between simulation values of the power efficiency and the estimated values by the learned VAE of the power efficiency will be described. FIG. 25 is a diagram for explaining simulation values and estimated values of the power efficiency distribution. FIG. 25 illustrates distributions of the power efficiency (vertical axis) in the latent space. As indicated by (1) in FIG. 25, the distributions of the power efficiency used in the learning data have the same tendency in the simulation values and the estimated values. While the simulation values and the estimated values have slightly different tendencies in the lower part of the power efficiency indicated by (2) in FIG. 25, the simulation values and the estimated values in the higher part of the power efficiency indicated by (3) in FIG. 25 have the same tendency.

Figure 26:
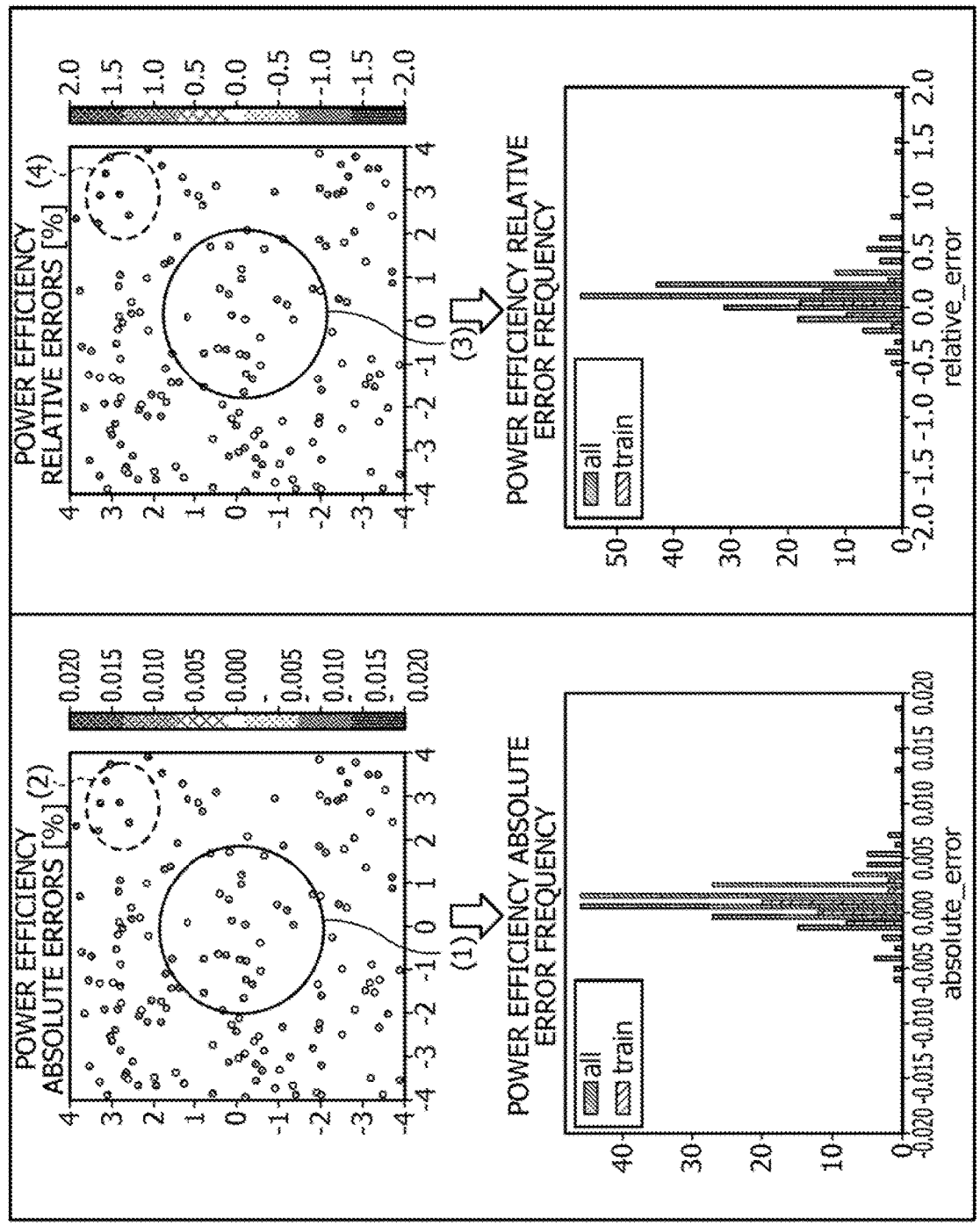
FIG. 26 is a diagram for explaining errors between estimated values and simulation values.

Next, errors between simulation values of the power efficiency and the estimated values by the learned VAE of the power efficiency will be described. FIG. 26 is a diagram for explaining errors between estimated values and simulation values. FIG. 26 illustrates distributions of absolute errors (vertical axis) and relative errors (vertical axis).

In the absolute errors, while, as indicated by (1) in FIG. 26, absolute errors of approximately ±0.0011 or lower occur within the learning data, slightly higher errors occur in a part outside the area of the learning data as indicated by (2) in FIG. 26. The frequency distribution of the errors approximately has a normal distribution tendency.

In the relative errors, while, as indicated by (3) in FIG. 26, relative errors of approximately ±0.12 or lower occur within the learning data, slightly higher errors occur in a part outside the area of the learning data as indicated by (4) in FIG. 26. The frequency distribution of the errors approximately has a normal distribution tendency.

Figure 27:
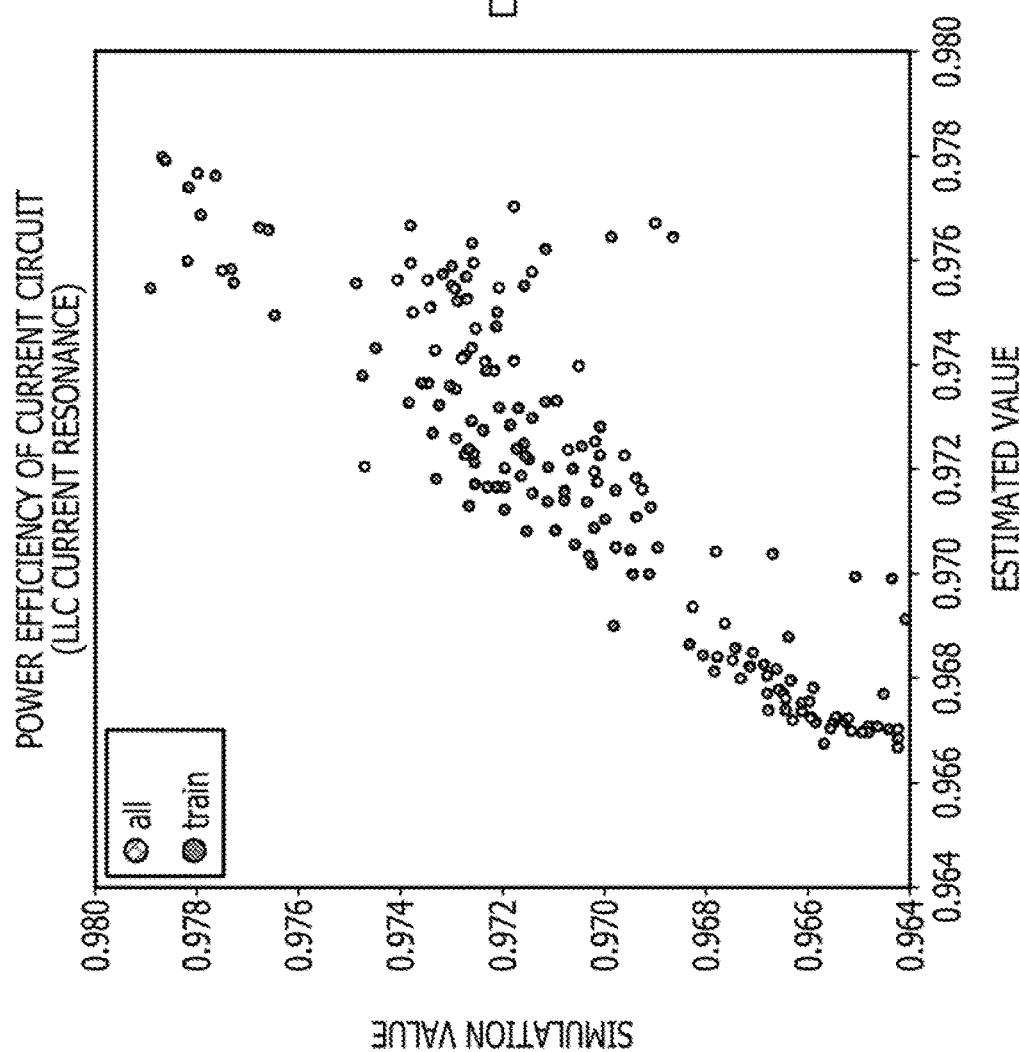
FIG. 27 is a diagram for explaining a comparison in power efficiency between estimated values and simulation values.

FIG. 27 is a diagram for explaining a comparison in power efficiency between estimated values and simulation values. FIG. 27 illustrates simulation values and estimated values using the learned VAE for the power efficiency of the power supply circuit (LLC current resonance) illustrated in FIG. 14. As illustrated in FIG. 27, the validation data with absolute errors of ±0.002 covers 95.5% of the interpolation area of the learning data, which is 62.5% of the whole data. The validation data with absolute errors of ±0.003 covers 100% of the interpolation area of the learning data, which is 82.0% of the whole data. The data with absolute errors of ±0.003 or lower contains 82% of the validation data (validated with random 200 points in the characteristic amount distribution), and combination candidates of parameter variables which maximize the design index were acquired.

(Optimization of Design Parameter Combination)

Figure 28:
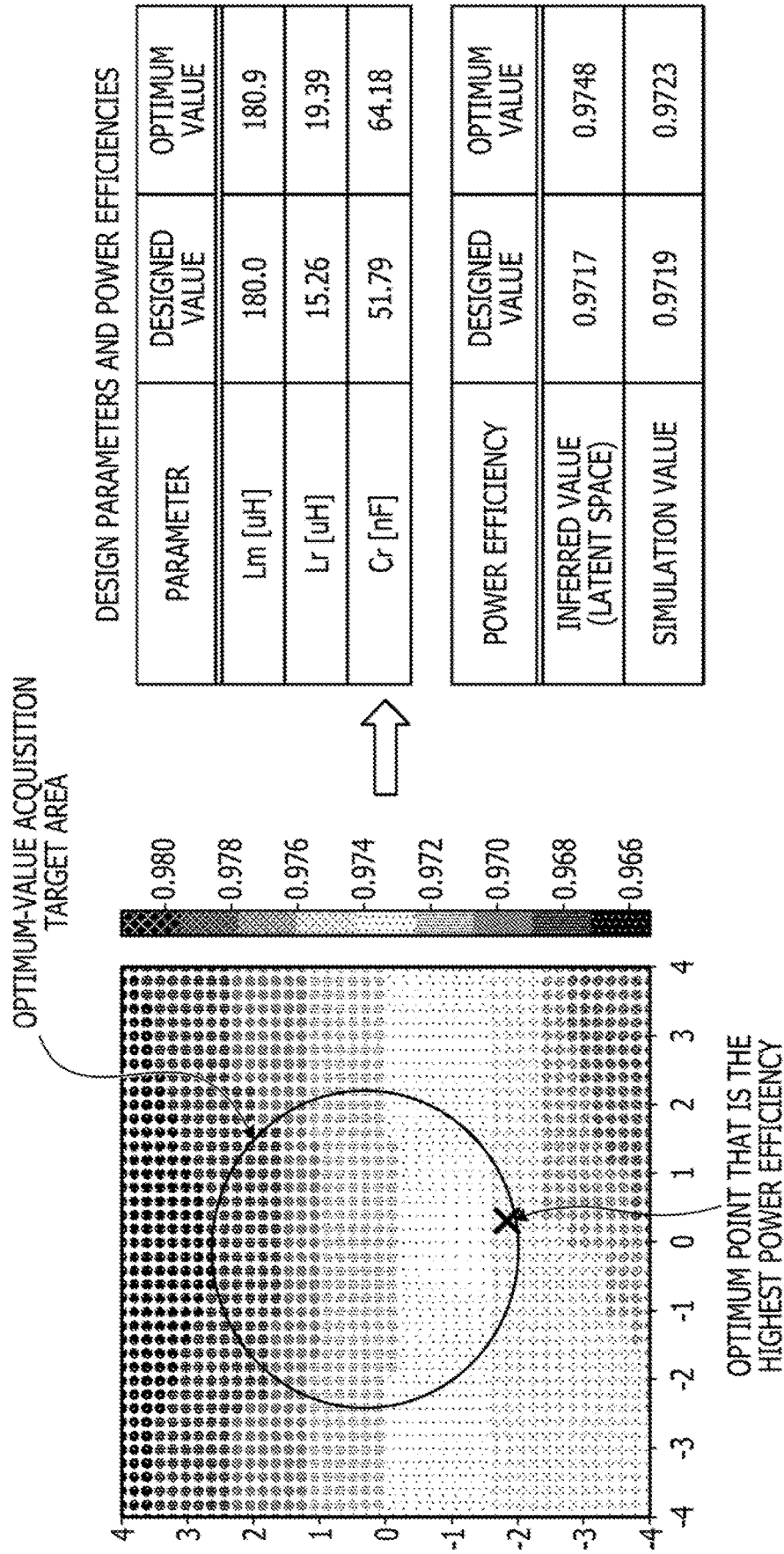
FIG. 28 is a diagram for explaining acquisition of an optimum solution.

Next, with reference to FIG. 28, acquisition of a parameter combination for the highest power efficiency from the design parameter combinations obtained in FIG. 27 will be described. FIG. 28 is a diagram for explaining acquisition of an optimum solution.

In the optimum solution acquisition illustrated in FIG. 28, 10,000 points are extracted randomly from the power efficiency distribution within the learning data, and an optimum point for the highest power efficiency over the latent space generated by the encoder in the learned VAE is acquired. The parameters are estimated from the optimum point by using the decoder in the learned VAE, and optimum values of the design parameters are acquired.

As illustrated in FIG. 28, the errors between the optimum solutions of the design parameters Lm, Lr and Cr and the designed values (optimum solutions acquired over the designed values) fit within an allowable range. With respect to the inferred value and simulation value of the power efficiency, the errors between the optimum solutions and the designed values also fit within an allowable range. In other words, for example, the optimum values acquired by using the learned VAE described in Embodiment 1 tend to be the same as the optimum design parameter combination in the design parameter range (within the learning data).

Effects

As described above, the information processing apparatus 10 according to Embodiment 1 learns a VAE by using training data including an objective function, inputs training data to the learned VAE (encoder) and places objective functions having higher similarities over a latent space. The information processing apparatus 10 generates a sampling set including arbitrary objective functions, inputs it to the learned VAE (decoder), reproduces the sampling set and thus acquires an optimum solution.

As a result, the information processing apparatus 10 may acquire an optimum solution rapidly even when the solution space of a problem is complex. The information processing apparatus 10 may configure a solution space in which objective functions are placed in a concentrated manner, and an optimum solution may be acquired with a lower number of data pieces by interpolation of the learned VAE.

The information processing apparatus 10 may express and output the characteristic amount of the solution space by using the latent space of the learned VAE, as illustrated in FIG. 20 and so on. Thus, even when an optimum solution may not be acquired by using the learned VAE and the learned VAE is re-learned, the fluctuation range of the variables may be easily and accurately reset, and the precision of the re-learning may be improved. For example, in a case where the distribution of the Lm parameter in the first learning is as illustrated in FIG. 20, the distribution of the second learning data may be extended or learning data for acquiring a different distribution may be generated, with reference to the distribution in FIG. 20.

Embodiment 2

While the embodiment of the present disclosure has been described, the present disclosure may be implemented in various different forms other than the embodiment described above.

[Data, Numerical Values, and the Like]

The data examples, the numerical value examples, the threshold values, the display examples and so on used in the above-described embodiment are merely examples and may be arbitrarily changed. The training data include an objective function that is correct solution information, and variables and the like that have an influence on the objective function may be arbitrarily selected. Having described the example in which the objective function and so on are imaged according to the embodiment above, embodiments are not limited thereto. Other information that may express characteristic amounts of images such as graphs may be adopted. Having described the optimum solutions of parameters in the circuit design in the specific example, they are merely examples, and the present disclosure is applicable to other fields.

Having described the example in which a variational autoencoder is used according to the embodiment, embodiments are not limited thereto. Other kinds of machine learning which may aggregate objective functions having high similarities may be used.

[System]

Processing procedures, control procedures, specific names, and information containing various kinds of data and parameters indicated in the specification and the drawings may be changed arbitrarily unless otherwise specified.

The constituent elements of the devices illustrated in the drawings are functional conceptual ones and not necessarily configured physically as illustrated in the drawings. For example, specific forms of distribution and integration of the devices are not limited to those illustrated in the drawings. For example, all or some of the devices may be functionally or physically distributed or integrated in any unit based on various loads, usage statuses, or the like.

All or an arbitrary part of the processing functions performed by the devices may be implemented by a central processing unit (CPU) and a program analyzed and executed by the CPU or may be implemented by a hardware device using wired logic coupling.

[Hardware]

Figure 29:
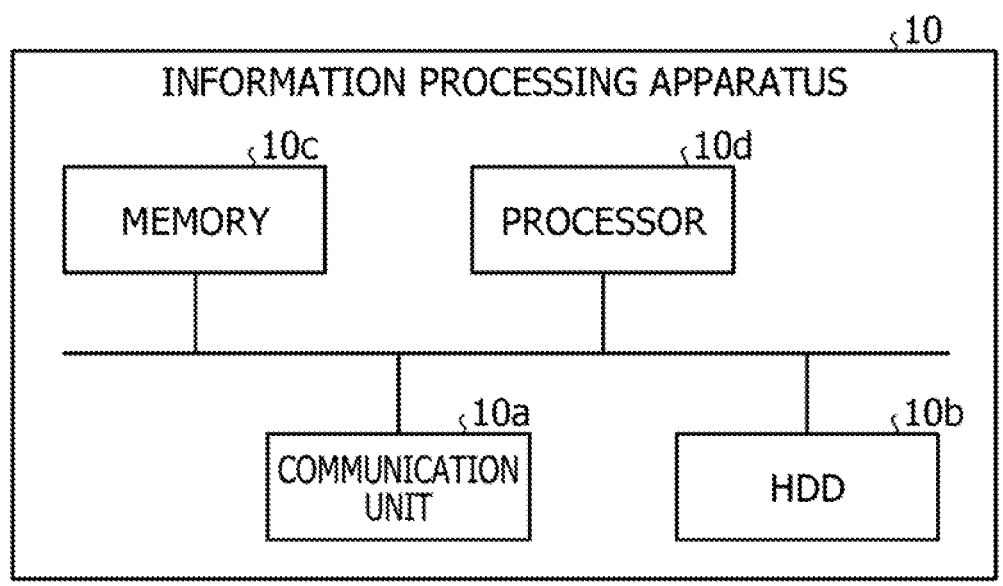
FIG. 29 is a diagram or explaining a hardware configuration example.

FIG. 29 is a diagram for explaining a hardware configuration example. As illustrated in FIG. 29, the information processing apparatus 10 includes a communication device 10a, a hard disk drive (HDD) 10b, a memory 10c, and a processor 10d. The components illustrated in FIG. 29 are coupled to each other by a bus or the like.

The communication device 10a is a network interface card or the like and communicates with other devices. The HDD 10b stores a program and DBs that operate functions illustrated in FIG. 2.

The processor 10d operates processes that execute the functions illustrated in, for example, FIG. 2 by reading from the HDD 10b or the like the program that executes processing operations identical to those of the processing units illustrated in FIG. 2 and loading the program into the memory 10c. For example, the processes execute the same functions as those of the processing units included in the information processing apparatus 10. More specifically, for example, the processor 10d reads out a program having the same functions as those of the training data generating unit 21, the learning unit 22, the set generating unit 23, the acquiring unit 24 and the like from the HDD 10b or the like. The processor 10d executes processes of executing the same processing as those of the training data generating unit 21, the learning unit 22, the set generating unit 23, the acquiring unit 24, and the like.

As described above, the information processing apparatus 10 operates as an information processing apparatus that executes the optimum solution acquisition method by reading and executing the program. The information processing apparatus 10 may also implement the same functions as those of the above-described embodiment by reading the program from a recording medium with the use of a medium reading device and by executing the read program. The program described in other embodiments is not limited to a program that is executed by the information processing apparatus 10. For example, the present disclosure may be applied similarly to a case where another computer or a server executes the program or a case where the other computer and the server cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A non-transitory computer-readable storage medium storing a program that causes a computer to execute a process, the process comprising:

training a variational autoencoder using a plurality of training data including objective functions and parameters having an influence on the objective functions;

generating a solution space in which parts with first objective functions and parts with second objective functions less than the first objective functions are placed, respectively, in a concentrated manner over a latent space of a variational autoencoder by inputting the plurality of training data to the trained variational autoencoder;

calculating a set of objective functions, variables and characteristic values by inputting a sampling set generated from the latent space to a decoder of the variational autoencoder;

acquiring a lowest value or a highest value of the objective functions of the set as an optimum solution for a desired objective function;

outputting, when acquiring the optimum solution, the set of objective functions, variables and characteristic values; and generating, when not acquiring the optimum solution, training data for re-learning by changing a fluctuation range of the variables of the set.

2. The non-transitory computer-readable storage medium storing a program according to claim 1, wherein the acquiring includes acquiring a parameter giving the optimum solution for the desired objective function by using the decoder of the variational autoencoder.

3. An optimum solution acquisition method executed by a computer, the optimum solution acquisition method comprising:

training a variational autoencoder using a plurality of training data including objective functions and parameters having an influence on the objective functions;

generating a solution space in which parts with first objective functions and parts with second objective functions less than the first objective functions are placed, respectively, in a concentrated manner over a latent space of a variational autoencoder by inputting the plurality of training data to the trained variational autoencoder;

calculating a set of objective functions, variables and characteristic values by inputting a sampling set generated from the latent space to a decoder of the variational autoencoder;

acquiring a lowest value or a highest value of the objective functions of the set as an optimum solution for a desired objective function;

outputting, when acquiring the optimum solution, the set of objective functions, variables and characteristic values; and generating, when not acquiring the optimum solution, training data for re-learning by changing a fluctuation range of the variables of the set.

4. The optimum solution acquisition method according to claim 3, wherein the acquiring includes acquiring a parameter giving the optimum solution for the desired objective function by using the decoder of the variational autoencoder.

5. An information processing apparatus, comprising:

a memory; and a processor coupled to the memory and configured to:

train a variational autoencoder using a plurality of training data including objective functions and parameters having an influence on the objective functions, generate a solution space in which parts with first objective functions and parts with second objective functions less than the first objective functions are placed, respectively, in a concentrated manner over a latent space of a variational autoencoder by inputting the plurality of training data to the trained variational autoencoder, calculate a set of objective functions, variables and characteristic values by inputting a sampling set generated from the latent space to a decoder of the variational autoencoder, acquire a lowest value or a highest value of the objective functions of the set as an optimum solution for a desired objective function, output, when acquiring the optimum solution, the set of objective functions, variables and characteristic values, and generate, when not acquiring the optimum solution, training data for re-learning by changing a fluctuation range of the variables of the set.

\* \* \* \* \*